(12) United States Patent
Guo et al.

(10) Patent No.: US 12,277,671 B2
(45) Date of Patent: Apr. 15, 2025

(54) MULTI-STAGE ATTENTION MODEL FOR TEXTURE SYNTHESIS

(71) Applicant: ADOBE INC., San Jose, CA (US)

(72) Inventors: Shouchang Guo, Ann Arbor, MI (US); Arthur Jules Martin Roullier, Paris (FR); Tamy Boubekeur, Paris (FR); Valentin Deschaintre, London (GB); Jerome Derel, Hauts-de-Seine (FR); Paul Parneix, Paris (FR)

(73) Assignee: ADOBE INC., San Jose, CA (US)

( * ) Notice: Subject to any disclaimer, the term of this patent is extended or adjusted under 35 U.S.C. 154(b) by 373 days.

(21) Appl. No.: 17/454,434

(22) Filed: Nov. 10, 2021

(65) Prior Publication Data

US 2023/0144637 A1    May 11, 2023

(51) Int. Cl.
*G06T 3/4046* (2024.01)
*G06T 5/77* (2024.01)
(Continued)

(52) U.S. Cl.
CPC .............. *G06T 3/4046* (2013.01); *G06T 5/77* (2024.01); *G06T 7/11* (2017.01); *G06T 7/40* (2013.01)

(58) Field of Classification Search
CPC . G06T 3/4046; G06T 5/77; G06T 7/11; G06T 7/40; G06T 2207/20021; G06T 2207/20081; G06T 2207/20084
(Continued)

(56) References Cited

U.S. PATENT DOCUMENTS

2019/0228508 A1\* 7/2019 Price ..................... G06T 5/70
2019/0311223 A1\* 10/2019 Wang ................... G06F 18/251
(Continued)

FOREIGN PATENT DOCUMENTS

WO    WO-2022195285 A1 \*  9/2022  ............. G06T 5/005

OTHER PUBLICATIONS

Image Extrapolation based on multi-col. convolutional attention network, by Xiaofeng Zhang, Songsong Wu, Hao Ding, Zuoyong Li, 2020 IEEE 4th INformation Technology, Networking, Electronic and Automation Control Conference (ITNEC 2020) 978-1-7281-4390-3/20 (Year: 2020).\*
(Continued)

*Primary Examiner* — Nancy Bitar
*Assistant Examiner* — Heath E. Wells
(74) *Attorney, Agent, or Firm* — F. CHAU & ASSOCIATES, LLC

(57) ABSTRACT

Systems and methods for image processing are described. Embodiments of the present disclosure include an image processing apparatus configured to efficiently perform texture synthesis (e.g., increase the size of, or extend, texture in an input image while preserving a natural appearance of the synthesized texture pattern in the modified output image). In some aspects, the image processing apparatus implements an attention mechanism with a multi-stage attention model where different stages (e.g., different transformer blocks) progressively refine image feature patch mapping at different scales, while utilizing repetitive patterns in texture images to enable network generalization. One or more embodiments of the disclosure include skip connections and convolutional layers (e.g., between transformer block stages) that combine high-frequency and low-frequency features from different transformer stages and unify attention to micro-structures, meso-structures and macro-struc-
(Continued)

Input Image 300

Modified Image 315 tures. In some aspects, the skip connections enable information propagation in the transformer network.

20 Claims, 10 Drawing Sheets

(51) Int. Cl.
   *G06T 7/11* (2017.01)
   *G06T 7/40* (2017.01)
(58) Field of Classification Search
   USPC .......................................................... 382/298
   See application file for complete search history.

(56) References Cited

U.S. PATENT DOCUMENTS

| | | | | |
|---|---|---|---|---|
| 2021/0216806 | A1* | 7/2021 | Yang | G06V 10/454 |
| 2021/0383589 | A1* | 12/2021 | Risser | G06N 3/045 |
| 2022/0108478 | A1* | 4/2022 | Houlsby | G06N 3/045 |
| 2023/0073175 | A1* | 3/2023 | Kim | G06N 3/0464 |
| 2023/0098817 | A1* | 3/2023 | Byun | G06T 7/194 |
| | | | | 382/103 |
| 2023/0177643 | A1* | 6/2023 | Yang | G06T 3/4053 |
| | | | | 382/156 |
| 2024/0212335 | A1* | 6/2024 | Qin, I | G06V 10/42 |

OTHER PUBLICATIONS

Texture Transform Attention for Realistic Image Inpainting, by Yejin Kim, Manri Cheon, Junwoo Lee, arXiv:2012.04242v1 [cs.CV] Dec. 8, 2020 (Year: 2020).*

Generative Image Inpainting by Jiahui Yu, Zhe Lin, Jimei Yang, Xiaohui Shen, Xin Lu, Thomas S. Huang, 2018 IEEE/CVF Conference on Computer Vision and Pattern Recognition 275-7075/18 (Year: 2018).*

High-Resolution Network for Photorealistic Style Transfer, by Li, Ming, Ye, Chunyang, Li, Wei, arXiv:1904.11617 [cs.CV], Apr. 25, 2019 (Year: 2019).*

Double Feature Fusion Network with Progressive Learning for Sharper Inpainting, by Zhichao Zhang, Hui Chen, Jinsheng Deng and Xiaoqing Yin, 2021 International Joint Conference on Neural Networks, Aug. 2021, 978-1-6654-3900-8 (Year: 2021).*

Image inpainting based on inside-outside Attention and Wavelet Decomposition, by Xingchen He, Xudong Cui, Qilong Li, IEEE Access, 2020.2984587, vol. 8, 2020 (Year: 2020).*

Zhou, et al., "Non-Stationary Texture Synthesis by Adversarial Expansion", ACM Transactions on Graphics (TOG) 37.4 (2018): 1-13; arXiv preprint arXiv:1805.04487v1 [cs.GR] May 11, 2018.

Gatys, et al., "Texture Synthesis Using Convolutional Neural Networks", Advances in neural information processing systems 28 (2015): 262-270.

Mardani, et al., "Neural FFTs for Universal Texture Image Synthesis", 34th Conference on Neural Information Processing Systems (NeurIPS 2020), Advances in Neural Information Processing Systems 33, 12 pages.

Liu, et al., "Transposer: Universal Texture Synthesis Using Feature Maps as Transposed Convolution Filter", vol. 1, No. 1, Article, arXiv:2007.07243v1 [cs.CV] Jul. 14, 2020, 16 pages.

Zeng, et al., "Learning Joint Spatial-Temporal Transformations for Video Inpainting", European Conference on Computer Vision. Springer, Cham, arXiv preprint arXiv:2007.10247v1 [cs.CV] Jul. 20, 2020, 23 pages.

* cited by examiner

MULTI-STAGE ATTENTION MODEL FOR TEXTURE SYNTHESIS

BACKGROUND

The following relates generally to image processing, and more specifically to texture synthesis.

Digital image processing refers to the use of a computer to edit a digital image using an algorithm or a processing network. For example, an image may be processed using image processing software. Image processing software is commonly used for image editing. Image editing is a subtask of image processing that modifies a digital image to meet user expectations. Image editing may include image cropping, size alteration, color change, or other image modification. In some cases, image processing may further include synthetic image generation.

Synthetic image generation is a subtask of image processing that generates new images or portions of an image from an existing dataset. Texture synthesis may include inferring a generating process from a texture to produce new samples of that texture. Thus, for example, a large image may be generated from a small example image, where textures from the small image are expanded into additional regions of the large image. In some cases, image generation may be accomplished using machine learning (e.g., using convolutional neural networks).

However, existing texture synthesis techniques cannot reproduce the full scope of natural textures, and cannot incorporate multiple designs to account for global patterns (i.e., meso-structures) in texture images. This results in unwanted artifacts, as well as increased computational costs and image processing latency to produce a suitable result. Therefore, there is a need in the art for improved image generation systems that have low computational requirements and are generalizable to different types of textures.

SUMMARY

The present disclosure describes systems and methods for image processing. Embodiments of the present disclosure include an image processing apparatus configured to generate modified images (e.g., images with image regions in-painted with a texture) using a multi-stage attention model that implements both coarse-to-fine processing and fine-back-to-coarse processing. The multi-stage texture synthesis model applies attention to micro-structures, meso-structures and macro-structures, and exploits repetitive patterns in texture images.

For instance, the model described herein may include a plurality of attention networks (e.g., transformer blocks) and convolutional networks that progressively refine image feature patch mappings at different scales through the multiple stages of the model. Additionally, the model may include skip connections along with the convolutional networks (e.g., between the transformer blocks) that propagate and fuse high-frequency and low-frequency features from different transformer stages. In some cases, convolutional networks may be used both as part of a skip connection between attention networks at a same scale (e.g., between transformer blocks 505 and 545 with reference to FIG. 5) and also between attention networks at different scales (e.g., between transformer blocks 505 and 515 with reference to FIG. 5). In some cases, the convolution network that is part of or subsequent to a skip connection (e.g., that does not change the scale of the feature maps) can modify the number of channels (e.g., to reduce the number of channels after concatenating outputs from different transformer stages).

A method, apparatus, non-transitory computer readable medium, and system for multi-stage attention model for texture synthesis are described. One or more aspects of the method, apparatus, non-transitory computer readable medium, and system include segmenting input features of an image to obtain a first input sequence of feature patches, wherein the image comprises a texture and a region to be in-painted with the texture; transforming the first input sequence using a first attention network to obtain a first output sequence of feature patches; computing a second input sequence of feature patches based on the first output sequence, wherein the second input sequence comprises smaller scale patches than the first input sequence; transforming the second input sequence using a second attention network to obtain a second output sequence of feature patches; computing a third input sequence of feature patches based on the first and the second output sequences, wherein the third input sequence comprises same scale patches as the first input sequence; transforming the third input sequence using a third attention network to obtain a third output sequence of feature patches; and generating a modified image based on the third output sequence, wherein the modified image comprises the texture within the region to be in-painted.

A method, apparatus, non-transitory computer readable medium, and system for multi-stage attention model for texture synthesis are described. One or more aspects of the method, apparatus, non-transitory computer readable medium, and system include receiving a ground truth image comprising a texture, a region to be in-painted with the texture, and ground truth pixel information for the region to be in-painted; segmenting features of the training image to obtain a first input sequence of feature patches; transforming the first input sequence using a first attention network to obtain a first output sequence of feature patches; computing a second input sequence of feature patches based on the first output sequence, wherein the second input sequence comprises smaller scale patches than the first input sequence; transforming the second input sequence using a second attention network to obtain a second output sequence of feature patches; computing a third input sequence of feature patches based on the first output sequence and the second output sequence, wherein the third input sequence comprises same scale patches as the first input sequence; transforming the third input sequence using a third attention network to obtain a third output sequence of feature patches; generating a modified image based on the third output sequence, wherein the modified image comprises the texture within the region to be in-painted; comparing the pixel information of the modified image within the region to be in-painted with the ground truth pixel information to obtain a structural loss; and updating parameters of the first attention network, the second attention network, and the third attention network based on the structural loss.

An apparatus, system, and method for multi-stage attention model for texture synthesis are described. One or more aspects of the apparatus, system, and method include a first attention network configured to transform a first input sequence of feature patches of an image to obtain a first output sequence of feature patches, wherein the image comprises a texture and a region to be in-painted with the texture; a first convolution network configured to perform a first convolution operation on first combined output features to obtain second combined input features, wherein the first combined output features comprise an arrangement of the first output sequence; a second attention network transforming a second input sequence of feature patches to obtain a second output sequence of feature patches, wherein the second input sequence is based on the second combined input features; a second convolution network configured to perform a second convolution operation on second combined output features to obtain third combined input features, wherein the second combined output features comprise an arrangement of the second output sequence; a third attention network configured to transform a third input sequence to obtain a third output sequence of feature patches, wherein the third input sequence is based on the third combined input features; and a decoder configured to generate a modified image based on the third output sequence, wherein the modified image comprises the texture within the region to be in-painted.

DETAILED DESCRIPTION

Figure 1:
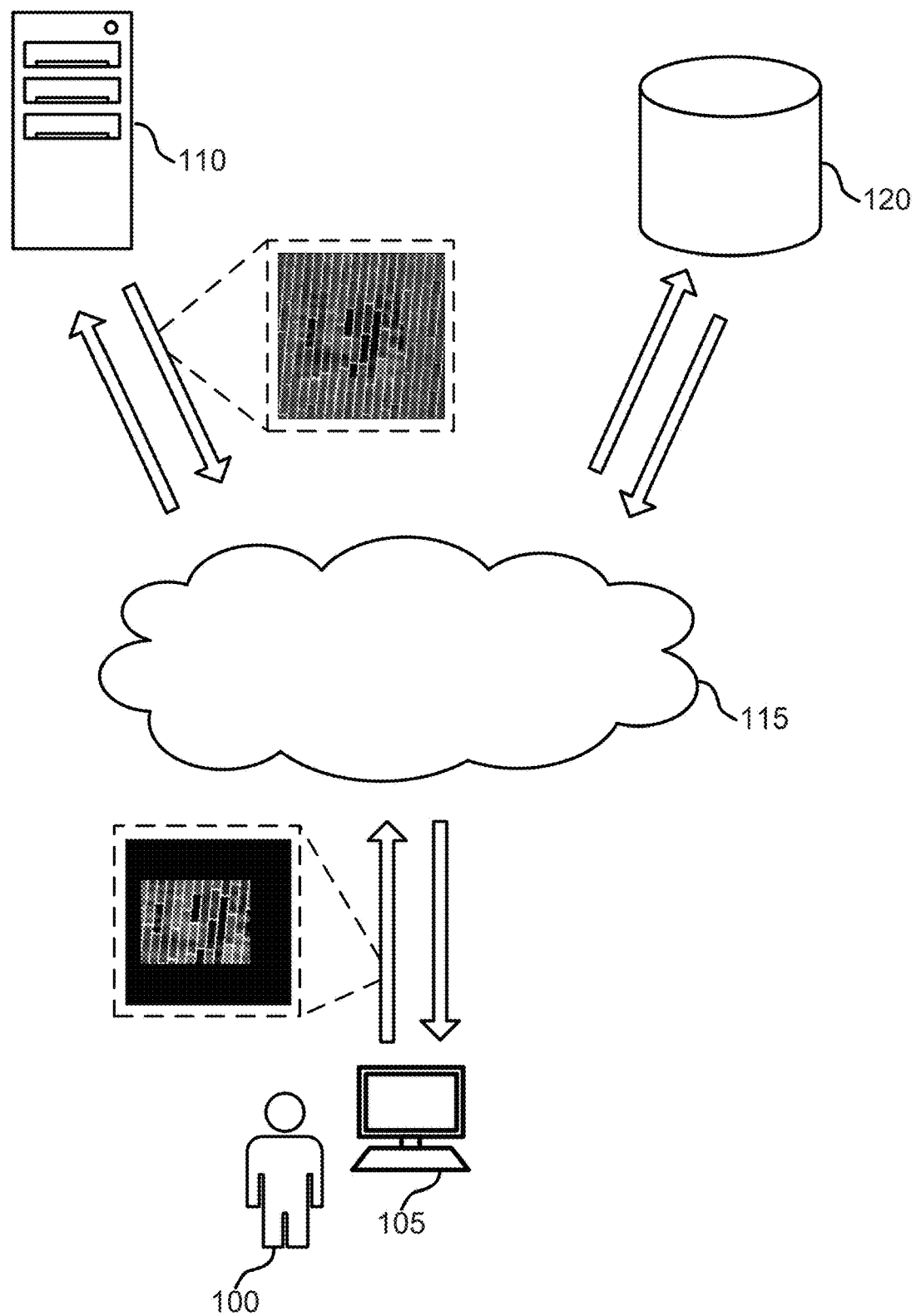
FIG. 1 shows an example of an image processing system according to aspects of the present disclosure.

The present disclosure describes systems and methods for image processing. Embodiments of the present disclosure include an image processing apparatus configured to efficiently perform texture synthesis (e.g., to extend textures in an input image while preserving the natural appearance of the synthesized texture pattern in a modified output image). In some aspects, the image processing apparatus implements an attention mechanism with a multi-stage model where different stages (e.g., different transformer blocks) progressively refine image feature patch mapping at different scales, while utilizing repetitive patterns in texture images to enable network generalization. One or more embodiments of the disclosure include skip connections and convolutional layers (e.g., between transformer block stages) that combine high-frequency and low-frequency features from different transformer stages. In some aspects, the skip connections enable information propagation in the transformer network.

Image generation systems are used to generate new images from an existing dataset. Conventional image generation systems depend on training a network for each texture to be generated. For example, some convolutional neural networks (CNNs) learn local operations that result in lack of generalization to unseen textures. Furthermore, some CNN-based texture synthesis models include complex operations (e.g., fast Fourier transform (FFT) upsampling designs including deformable convolution or self-similarity map calculation) that result in heavy computational load. As a result, conventional texture synthesis networks lack texture generalization, have high computational costs, or both.

Textures with meso-structure are particularly challenging for conventional texture synthesis techniques. A meso-structure is any intermediate structure between fine-grained textures and large-scale objects in an image. For example, an image of a house might include fine-grained brick textures (micro-structures), a pattern of mortar between the bricks (meso-structure), and the overall outlines of the house (macro-structure). Conventional texture synthesis networks can capture the fine-grained textures of the bricks, but the mortar lines may be inconsistent or unnatural.

Embodiments of the present disclosure include a multi-stage attention model for texture synthesis generalizable to different texture classes. Some embodiments use global structural information for synthesis of texture images. For example, a multi-stage attention model can be used for coarse-to-fine processing (e.g., large scale feature patch processing to finer scale feature patch processing) and fine-back-to-coarse processing (e.g., fine scale feature patch processing to larger scale feature patch processing) of feature maps.

In some examples, the multi-stage attention model applies one or more distinct attention networks to micro-structures, meso-structures, and macro-structures (e.g., via progressively refining image feature patch mapping at different scales through the multiple stages of the model), unifies attention to micro-structures, meso-structures and macro-structures, and therefore utilizes repetitive patterns at different structural levels. Some embodiments of the disclosure include skip connections and convolutional layers connecting the attention layers in the network.

By applying the unconventional techniques of progressively refining patch mapping at different scales through multiple attention stages (e.g., coarse-to-fine transformer stages and fine-back-to-coarse transformer stages), embodiments of the present disclosure provide computationally efficient texture synthesis that is more generalizable to multiple texture classes (e.g., micro-structure, meso-structure, and macro-structure). Further, the techniques described herein may provide for generation of larger and more natural looking synthetic textures, compared to conventional techniques.

For instance, in some aspects, the network model enables generation of large images (e.g., synthetic textures two or more times the size of a texture in an original input image) with a single trained network. Further, the network model may be applicable to images with multiple texture patterns including texture images with varying amounts of randomness and structure or challenging patterns, like brick walls arranged at different angles. In some examples, a trained network model performs real-time synthesis of texture images with reduced user input.

Embodiments of the present disclosure may be used in the context of an image processing system for texture synthesis. For example, a texture in-painting system based on the present disclosure may take an input image (e.g., an image including a texture and a region to be in-painted with synthesized texture) and efficiently generate a modified image (e.g., an output image including the texture in the region to be in-painted). An example of an application of the inventive concept in the texture in-painting context is provided with reference to FIGS. 1-3. Details regarding the architecture of an example image processing apparatus and machine learning network are provided with reference to FIGS. 4 and 5. Aspects of corresponding machine learning inference are described with reference to FIGS. 6-9. A description of the training of the machine learning model is provided with reference to FIG. 10.

Texture Editing

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 4.

In the example of FIG. 1, the user 100 communicates with the image processing apparatus 110 via the user device 105. For example, the user 100 provides or selects an input image (e.g., a source image). In the example illustrated in FIG. 1, the input image includes an image including a texture that the user 100 wishes to expand (e.g., the input image includes an original texture and a region to be in-painted with synthetic texture generated based on the original texture). The user device 105 transmits the input image to the image processing apparatus 110 to modify one or more aspects of the input image. For instance, in the example of FIG. 1, a user 100 may, via user device 105, configure a texture synthesis operation based on the input image using image processing apparatus 110 (e.g., to enlarge or expand a texture in the input image). Accordingly, image processing apparatus 110 may receive the input image and generate one or more modified images including synthetic texture based on an original texture in the input image, as described in more detail herein.

As an example, FIG. 1 shows an input image including a texture (e.g., an original texture) and a region to be in-painted with the texture (e.g., a region surrounding the original texture to be in-painted with synthetic texture based on the original texture). Upon receiving an input image, image processing apparatus 110 may encode the input image to obtain input features for the image (e.g., a multi-dimensional vector that represents input features of the input image in a vector space). Image processing apparatus 100 then segments the input features to obtain an input sequence of feature patches (e.g., as described in more detail herein, for example, with reference to FIG. 8). The input sequence of feature patches is then transformed by a transformer stage (e.g., an attention network) to obtain an output sequence of feature patches.

As described in more detail herein, the image processing apparatus 110 may implement a multi-stage attention model, such that input sequences of different scale feature patches may be processed at each transformer stage. For instance, the output sequence of feature patches from one transformer stage may be taken as an input sequence to a subsequent stage, where convolution operations and segmentation operations between different transformer stages may result in feature patch processing at different scales for each stage (e.g., as described in more detail herein, for example, with reference to FIG. 5). Ultimately, the image processing apparatus 110 may generate a modified image via the multi-stage attention model, where the modified image includes texture (e.g., synthetic texture based on the original texture of the input image) within the region to be in-painted (e.g., such that the modified image includes enlarged or expanded texture, for example, based on the input image and edit commands from the user 100).

A user device 105 may be a personal computer, laptop computer, mainframe computer, palmtop computer, personal assistant, mobile device, or any other suitable processing apparatus. In some examples, the functions of the image processing apparatus 110 are performed locally on the user device 105 (e.g., within an image editing software).

In some cases, the image processing apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

In some examples, the user device 105 communicates with the image processing apparatus 110 via the cloud 115. A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

In some aspects, the present disclosure describes systems and methods to synthesize large texture images from small example images. Modified images that are generated (e.g., via processing apparatus 110) may preserve the structure and content of input image textures, while preserving natural looking appearance in the generated synthetic textures. Embodiments of the present disclosure include a texture synthesis model configured to perform fast synthesis (e.g., with reduced user effort). For example, a user 100 may click a button after training for synthesis of texture images. In some cases, the model generalizes to different classes of textures (e.g., from random to structured textures) using a single network.

As used herein, a patch (e.g., or feature patch) may include or refer to a region of pixels in an image or a region of image feature. In a feature patch, each pixel corresponds to features, and feature patches may be arranged in a two dimensional (2D) arrangement to form an image or the image features (e.g., as described in more detail herein, for example with reference to FIGS. 5, 8, and 9).

As used herein, scale may include or refer to the portion of an image that each feature patch corresponds to. For example, a stage of a multi-stage attention model that operates on feature patches with smaller scale means the feature patch corresponds to a smaller portion of the input image, and the patch corresponds to fewer pixels in the input image (e.g., as further described herein, for example, with reference to FIGS. 5 and 9).

As used herein, resolution may include or refer to the number of pixels in an image or a set of image features. A convolution operation can reduce the resolution image so that each pixel of the output corresponds to multiple input pixels. For example, a stage of the network operating on patches with lower resolution means each feature pixel corresponds to more image pixels of the input image.

As used herein, a channel may include or refer to parameters associated with a pixel. For example, an image pixel may have 3 parameters (e.g., for red, green and blue colors). In some cases, a convolution operation can reduce the resolution of an image while increasing the number of channels per pixel (e.g., as further described herein, for example, with reference to FIG. 5)

Figure 2:
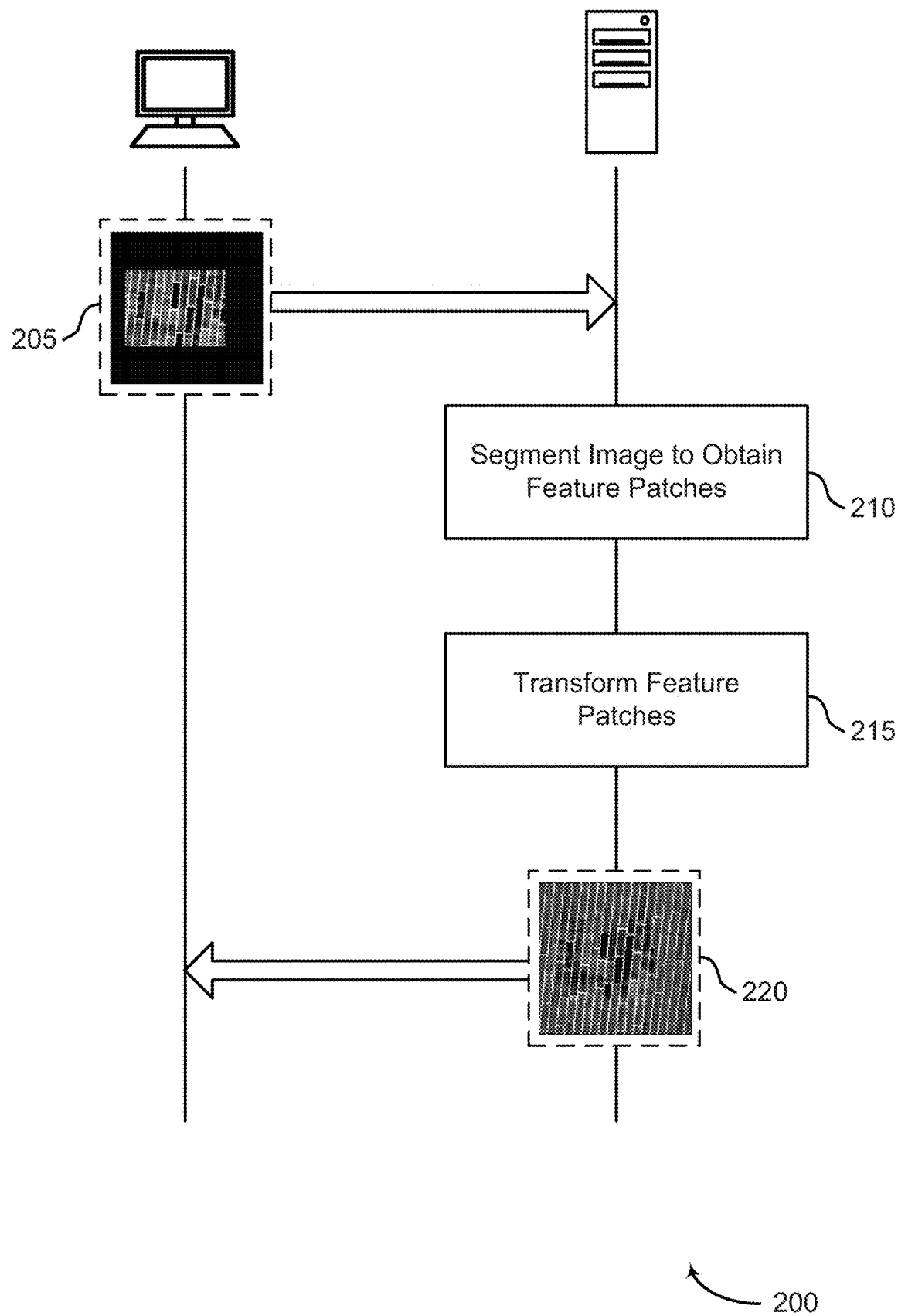
FIG. 2 shows an example of a method for image editing according to aspects of the present disclosure.

FIG. 2 shows an example of a method 200 for image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Texture synthesis refers to generation of a large texture image from a small example image while preserving the structure and texture content. Some learning-based methods for texture synthesis use convolutional neural networks (CNNs) and use training one network for each texture. However, conventional texture synthesis methods using CNNs are not generalizable to unseen textures due to the locality of operations in CNNs, while the synthesis task depends on the use of global structural information. Efforts to overcome these limitations can be computationally expensive.

Embodiments of the present disclosure include a texture synthesis model that employs attention mechanism in transformers. In some cases, the attention mechanism uses long-range structural dependencies for texture synthesis and network generalization. The designs in the transformer network enable learned patch matching and blending with scale versatility. The trained network performs aggressive texture expansion, is universal to a broad range of texture patterns and has high computational efficiency.

In some aspects, the network architecture (e.g., the multi-stage attention model) uses transformers as building blocks. The network model can be interpreted as a learned patch matching and blending at different scales (e.g., as described in more detail herein, for example with reference to FIG. 5).

For instance, at operation 205, the system provides an image with a region to be in-painted. In some cases, the operations of this step refer to, or may be performed by, a user device as described with reference to FIG. 1.

At operation 210, the system segments the image to obtain feature patches using a multi-stage attention model. For instance, the system may encode the input image to obtain input features for the image (e.g., a multi-dimensional vector that represents input features of the input image in a vector space), and the system may segment the input features to obtain a sequence of feature patches. In some cases, the operations of this step refer to, or may be performed by, an image processing apparatus as described with reference to FIGS. 1 and 4.

At operation 215, the system transforms the feature patches using the multi-stage attention model. For example, sequences of feature patches may be processed through multiple stages of an attention model, where an input sequence for one transformer stage may be based on an output sequence from a previous transformer stage (e.g., as described in more detail herein, for example, with reference to FIG. 5). In some cases, the operations of this step refer to, or may be performed by, an image processing apparatus as described with reference to FIGS. 1 and 4.

At operation 220, the system provides a modified image with the texture within the region to be in-painted. For example, an output sequence of feature patches from a final stage in a multi-stage attention model may be used (e.g., by a decoder) to generate a modified image including the texture within the region to be in-painted, and the generated modified image may be provided to the user device. In some cases, the operations of this step refer to, or may be performed by, an image processing apparatus as described with reference to FIGS. 1 and 4.

Figure 3:
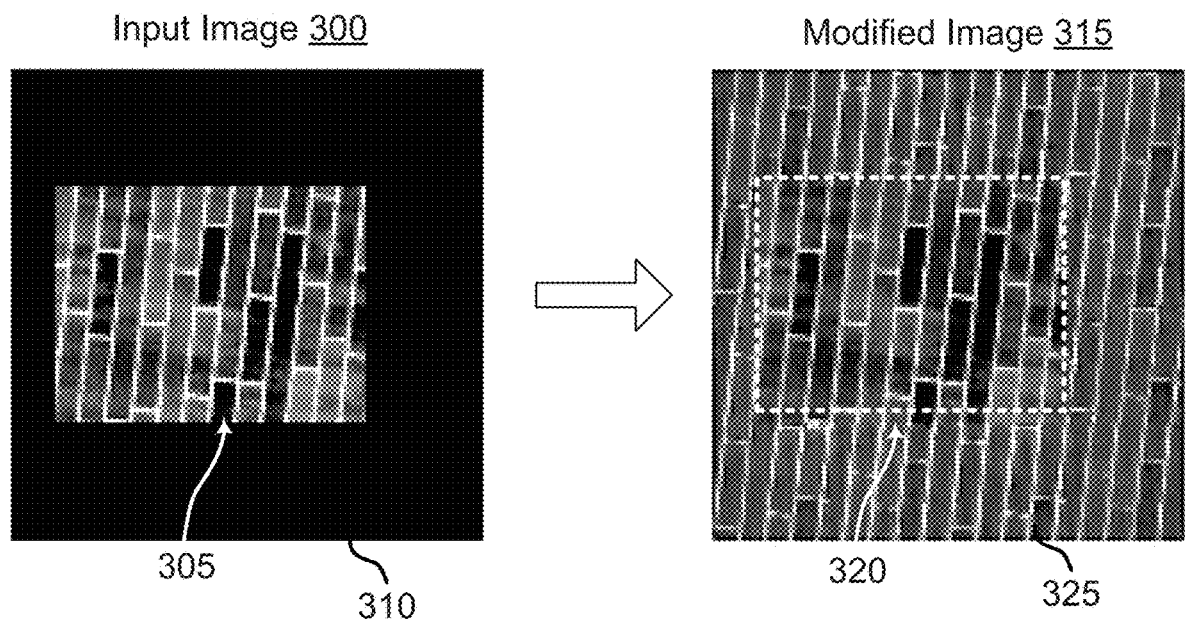
FIG. 3 shows an example of a texture synthesis method according to aspects of the present disclosure.

FIG. 3 shows an example of a texture synthesis process according to aspects of the present disclosure. The example shown includes input image 300 and modified image 315. In one aspect, input image 300 includes texture 305 and region 310. In one aspect, modified image 315 includes original texture 320 and in-painted region 325 (e.g., a region including synthetic texture generated based on the original texture 320, according to the techniques described herein).

FIG. 3 shows an example of a modified image 315 generated from an input image 300. The input image 300 includes, as an example, a brick wall texture 305, as well as a region 310 to be in-painted with synthetic texture based on the brick wall texture 305. With conventional techniques, such in-painting may be difficult. For instance, it may be challenging to generate additional texture surrounding the original brick wall texture 305 that appears natural to an observer (e.g., as it may be desirable for bricks and grout or mortar lines to match up, without having obvious appearance of copy/paste-like repetition patterns of light and dark color bricks, etc.)

The texture synthesis techniques described herein may be performed to generate synthetic textures (e.g., at a large scale, for example up to 2× the size of the original texture 305, or larger) for random or structural textures, and challenging structures like brick walls, while maintaining natural appearance of the original texture 320 and the in-painted region 325 of generated modified image 315. Techniques described herein may further result in efficient processing speed for such tasks (e.g., a modified image 315 may be generated from input image 300 in, for example, less than 0.5 seconds).

Some embodiments of the present disclosure include a U-Attention network with multi-stage attention model (e.g., multi-stage hourglass vision transformers may enable 2× texture synthesis with one trained network). As described herein, the trained network may be applicable to a broad range of texture patterns. The trained network provides real-time texture synthesis results with reduced user effort at testing time. Further, the network model may be applied to challenging textures like structural brick walls at different angles, while maintaining high performance in generating image with a natural appearance to an image editor or an observer (e.g., as illustrated in FIG. 3).

Network Architecture

Figure 4:
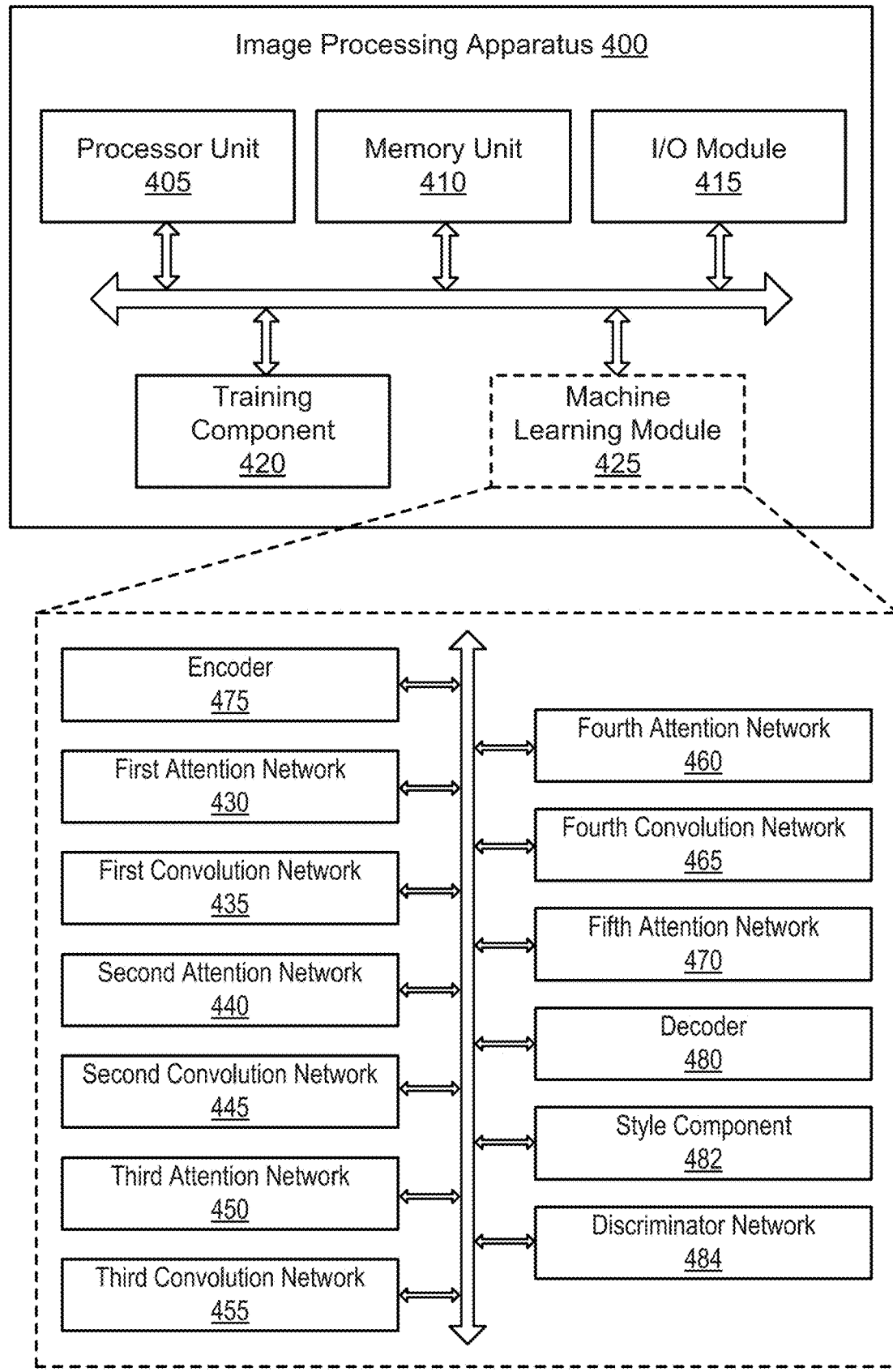
FIG. 4 shows an example of an image processing apparatus according to aspects of the present disclosure.

FIG. 4 shows an example of an image processing apparatus 400 according to aspects of the present disclosure. Image processing apparatus 400 is an example of, or includes aspects of, the corresponding element described with reference to FIG. 1. In one aspect, image processing apparatus 400 includes processor unit 405, memory unit 410, I/O module 415, training component 420, and machine learning module 425. In one aspect, machine learning module 425 includes first attention network 430, first convolution network 435, second attention network 440, second convolution network 445, third attention network 450, third convolution network 455, fourth attention network 460, fourth convolution network 465, fifth attention network 470, encoder 475, decoder 480, style component 482, and discriminator network 484.

The number of attention networks and convolution networks depends on the number of layers in an inverted pyramid structure. So, for example, if there are n layers there will be 2n− 1 attention networks and 2n−2 convolution layers. Thus, in some embodiments (e.g., where n=2) the machine learning module 425 does not include the fourth attention network 460, fourth convolution network 465, and fifth attention network 470. In other embodiments, (e.g., where n>3), there are additional attention networks and convolution networks. An example arrangement with n=3 is described with reference to FIG. 5.

An image processing apparatus 400 capable of implementing a multi-stage attention model for texture synthesis is described. One or more aspects of the image processing apparatus 400 include a first attention network 430 configured to transform a first input sequence of feature patches of an image to obtain a first output sequence of feature patches, wherein the image comprises a texture and a region to be in-painted with the texture. One or more aspects of the image processing apparatus 400 include a first convolution network 435 configured to perform a first convolution operation on first combined output features to obtain second combined input features, wherein the first combined output features comprise an arrangement of the first output sequence. One or more aspects of the image processing apparatus 400 include a second attention network 440 transforming a second input sequence of feature patches to obtain a second output sequence of feature patches, wherein the second input sequence is based on the second combined input features; and a second convolution network 445 configured to perform a second convolution operation on second combined output features to obtain third combined input features, wherein the second combined output features comprise an arrangement of the second output sequence.

One or more aspects of the image processing apparatus 400 include a third attention network 450 configured to transform a third input sequence to obtain a third output sequence of feature patches, wherein the third input sequence is based on the third combined input features. One or more aspects of the image processing apparatus 400 also include a decoder 480 configured to generate a modified image based on the third output sequence, wherein the modified image comprises the texture within the region to be in-painted.

Some examples of the apparatus 400, system, and method described herein further include an encoder 475 configured to generate input features for the image, wherein the first input sequence is based on the input features. Some examples of the apparatus, system, and method further include a skip connection between the first attention network and the third attention network.

A processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory units 410 include solid state memory and a hard disk drive. In some examples, memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An I/O module 415 (e.g., an I/O controller) may manage input and output signals for a device. I/O module 415 may also manage peripherals not integrated into a device. In some cases, an I/O module 415 may represent a physical connection or port to an external peripheral. In some cases, an I/O module 415 may utilize an operating system such as iOS®, ANDROID®, MS-DOS®, MS-WINDOWS®, OS/2®, UNIX®, LINUX®, or another known operating system. In other cases, an I/O module 415 may represent or interact with a modem, a keyboard, a mouse, a touchscreen, or a similar device. In some cases, an I/O module 415 may be implemented as part of a processor. In some cases, a user may interact with a device via IO controller or via hardware components controlled by an I/O module 415.

In some examples, a machine learning module 425 may include a neural processing unit (NPU) which is a microprocessor that specializes in the acceleration of machine learning algorithms. For example, machine learning module 425 (e.g., and/or subcomponents of machine learning module 425) may operate on predictive models such as artificial neural networks (ANNs) or random forests (RFs). In some cases, a machine learning module 425 is designed in a way that makes it unsuitable for general purpose computing such as that performed by a CPU or processor unit 405. Additionally or alternatively, the software support for a machine learning module 425 may not be developed for general purpose computing.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

An attention mechanism is a method of placing differing levels of importance on different elements of an input. A simplified method for calculating an attention map may involve three basic steps. First, compute the similarity between query and key vectors obtained from the input to generate attention weights. Similarity functions may include dot product, splice, detector, etc. Next, use a softmax function to normalize the weights. Finally, weigh the attention weights in together with the corresponding values.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

According to some aspects, image processing apparatus 400 segments input features of an image to obtain a first input sequence of feature patches, where the image includes a texture and a region to be in-painted with the texture. In some examples, image processing apparatus 400 combines the first output sequence to obtain first combined output features. In some examples, image processing apparatus 400 segments the second combined input features to obtain the second input sequence, where the second input sequence includes a larger number of feature patches than the first input sequence. In some examples, image processing apparatus 400 combines the second output sequence to obtain second combined output features.

In some examples, image processing apparatus 400 segments the third combined input features to obtain the third input sequence, where the third input sequence includes a same number of features patches as the first input sequence. In some examples, image processing apparatus 400 expands an input image with zero-padding along a border of the image to create the image including the region to be in-painted. In some examples, image processing apparatus 400 provides the first output sequence together with the third input sequence as an input to the third attention network to obtain the third output sequence. In some examples, image processing apparatus 400 segments initial features of the image to obtain a fourth input sequence of feature patches, where the fourth input sequence includes larger scale patches than the first input sequence. In some examples, image processing apparatus 400 provides the fourth output sequence as an input to the fifth attention network to obtain the fifth output sequence.

According to some aspects, training component 420 receives a ground truth image including a texture, a region to be in-painted with the texture, and ground truth pixel information for the region to be in-painted. In some examples, training component 420 compares the pixel information of the modified image within the region to be in-painted with the ground truth pixel information to obtain a structural loss. In some examples, training component 420 updates parameters of the first attention network 430, the second attention network 440, and the third attention network 450 based on the structural loss. In some examples, training component 420 compares the modified image features to the ground truth features to obtain a perceptual loss, where the parameters are updated based on the perceptual loss. In some examples, training component 420 compares the statistical information for the ground truth image with the statistical information for the modified image to obtain a style loss, where the parameters of the first attention network 430, the second attention network 440, and the third attention network 450 are updated based on the style loss.

In some examples, training component 420 computes a generative adversarial network (GAN) loss based on the determination, where the parameters are updated based on the GAN loss. In some examples, training component 420 crops an original image to obtain a training input image. In some examples, training component 420 pads a cropped portion of the original image with zeros to obtain the region to be in-painted, where the ground truth pixel information for the region to be in-painted is based on the cropped portion of the original image.

According to some aspects, first attention network 430 transforms the first input sequence to obtain a first output sequence of feature patches. According to some aspects, first convolution network 435 computes a second input sequence of feature patches based on the first output sequence, where the second input sequence includes smaller scale patches than the first input sequence. In some examples, first convolution network 435 performs a first convolution operation on the first combined output features to obtain second combined input features.

According to some aspects, second attention network 440 transforms the second input sequence to obtain a second output sequence of feature patches. According to some aspects, second convolution network 445 computes a third input sequence of feature patches based on the second output sequence, where the third input sequence includes same scale patches as the first input sequence. In some examples, second convolution network 445 performs a second convolution operation on the second combined output features to obtain third combined input features.

According to some aspects, third attention network 450 transforms the third input sequence to obtain a third output sequence of feature patches. According to some aspects, third convolution network 455 computes the first input sequence based on the fourth output sequence.

According to some aspects, fourth attention network 460 transforms the fourth input sequence to obtain a fourth output sequence of feature patches. According to some aspects, fourth convolution network 465 computes a fifth input sequence of feature patches based on the third output sequence, where the fifth input sequence includes same scale patches as the first input sequence.

According to some aspects, fifth attention network 470 transforms the fifth input sequence to obtain a fifth output sequence, where the modified image is generated based on the fifth output sequence.

According to some aspects, encoder 475 encodes the ground truth image to obtain ground truth features. In some examples, encoder 475 encodes the modified image to obtain modified image features. According to some aspects, encoder 475 is configured to generate input features for the image, wherein the first input sequence is based on the input features.

According to some aspects, decoder 480 generates a modified image based on the third output sequence, where the modified image includes the texture within the region to be in-painted.

Decoder 480 is an example of, or includes aspects of, the corresponding element described with reference to FIG. 5. Encoder 475 is an example of, or includes aspects of, the corresponding element described with reference to FIG. 5.

According to some aspects, style component 482 generates statistical information for the ground truth image. In some examples, style component 482 generates statistical information for the modified image. According to some aspects, style component 482 is configured to generate statistical style information based on an output of the decoder 480.

According to some aspects, discriminator network 484 determines whether the modified image (e.g., an output of the decoder) is an original image.

Figure 5:
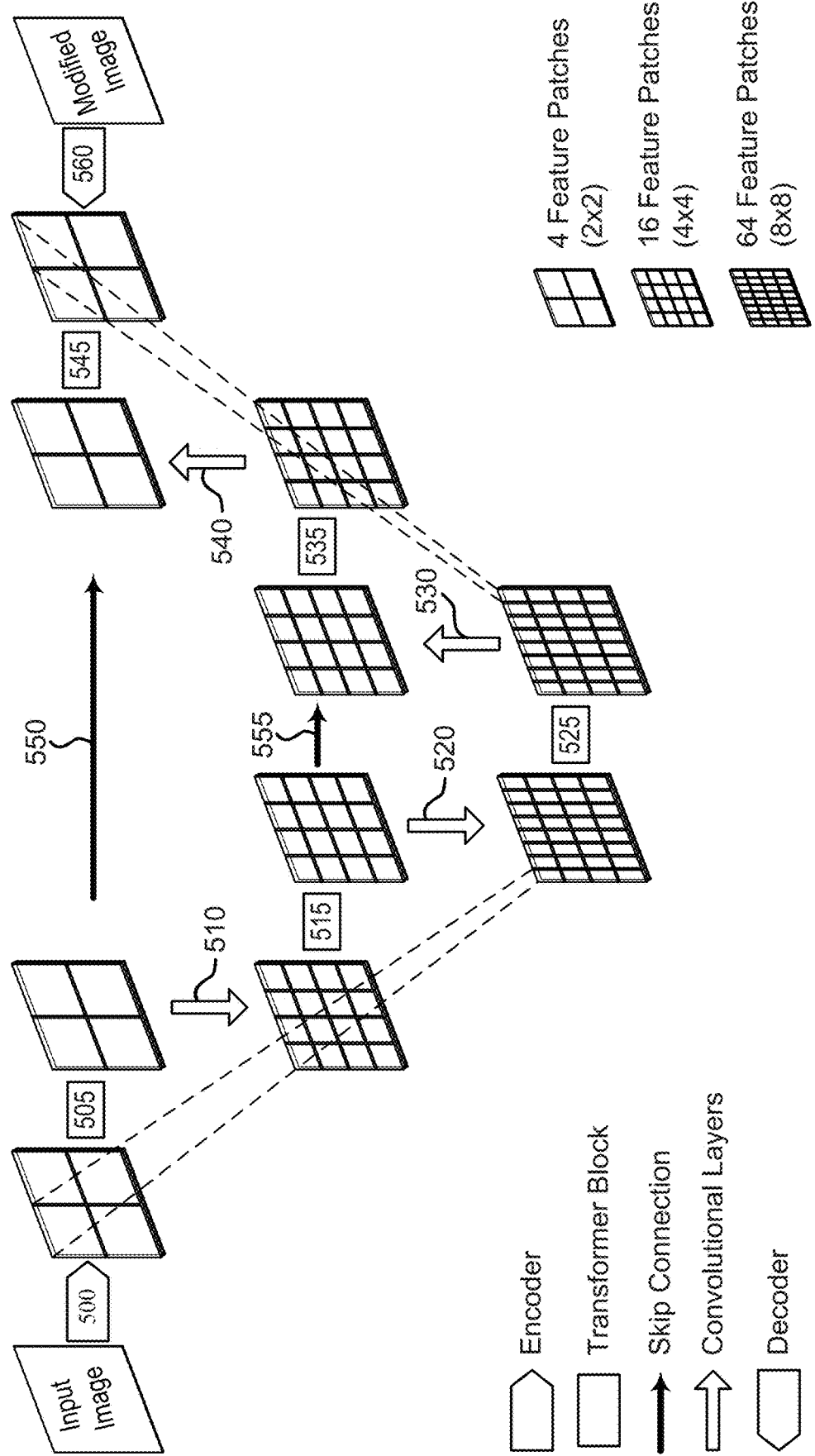
FIG. 5 shows an example of a multi-stage hourglass attention network according to aspects of the present disclosure.

FIG. 5 shows an example of a multi-stage hourglass attention network according to aspects of the present disclosure. The example shown includes encoder 500, first transformer block 505, first convolutional layers 510, second transformer block 515, second convolutional layers 520, third transformer block 525, third convolutional layers 530, fourth transformer block 535, fourth convolutional layers 540, fifth transformer block 545, first skip connection 550, second skip connection 555, and decoder 560.

Transformer networks (e.g., transformer blocks, such as first transformer block 505, second transformer block 515, third transformer block 525, fourth transformer block 535, fifth transformer block 545) maybe an example of an attention network as described with reference to FIG. 4. In some cases, a machine learning model for texture transfer may have fewer or more than the 5 attention networks (e.g., transformer blocks) depicted in FIG. 5.

For example, in an embodiment with three attention networks, first transformer block 505 and fifth transformer block 545 could be omitted. In this case, second transformer block 515 would be the first attention network, third transformer block 525 would be the second attention network, and fourth transformer block 535 would be the third attention network. In another embodiment, additional attention networks can be added before first transformer block 505 and after fifth transformer block 545.

As described herein, an attention mechanism (e.g., as implemented in a transformer block) may naturally exploit long-range structural dependencies for texture synthesis and network generalization. Transformer blocks perform transformation operations that may include nonlinear mapping of an input sequence of patches to another output sequence of patches. For instance, attention maps may indicate which feature patches of an input sequence to pull data from in order to construct a new patch (e.g., as further described herein, for example, with reference to FIGS. 8 and 9).

Embodiments of the present disclosure include a texture synthesis model such that the input image to be out-painted is brought to the latent space by the encoder 500. In some cases, the main body of the network (i.e., with transformers as building blocks, such as first transformer block 505, second transformer block 515, third transformer block 525, fourth transformer block 535, fifth transformer block 545) partitions the feature maps into patches and processes sequences of patches. Finally, the processed sequences of patches are placed together and brought back to the image domain by the decoder 560.

Accordingly, one or more embodiments include a U-shaped attention network with multi-stage hourglass transformers as the generative model for texture synthesis. The network includes a multi-stage hourglass backbone, skip connections and convolutional layers for image-to-image mapping. The hourglass backbone for coarse-to-fine and fine-back-to-coarse processing refines patch mapping. In some cases, the backbone network progressively refines the mappings at different scales, unifies attention to micro-structures, meso-structures and macro-structures, and exploits repetitive patterns in texture images.

In some aspects, the techniques described herein provide for three designs for image-to-image mapping, and thereby enable fast and aggressive texture out-painting for various types of textures. The designs of the model include a multi-stage pyramid transformer network, a multi-stage hourglass transformer network and skip connections and convolutional layers. The pyramid transformer network is used for coarse-to-fine patch mapping and the hourglass transformer network is used for a coarse-to-fine and fine-back-to-coarse mapping scheme. Additionally, skip connections and convolutional layers are provided between different stages of transformers for information propagation and fusion.

In other words, embodiments of the present disclosure include combination of attention mechanisms with multi-stage hourglass vision transformers. In some cases, the attention mechanism enables ways for patch mapping at varying scales and provides visualizations. For example, learned patch matching and rendering may be visualized at the stages of the network model. The network progressively increases performance with consecutive transformer stages operating on patches of varying scales and propagating information between stages.

FIG. 5 shows an example of a multi-stage attention model (e.g., a multi-stage hourglass network), where the model is formed by taking the input patches of a coarse-to-fine (large-to-small) and fine-back-to-coarse (small-to-large) scales at different stages of the model (e.g., the example of FIG. 5 includes five stages via the five transformer blocks). The multi-stage network progressively refines patch mapping at different scales, unifies attention to micro-structures, meso-structures and macro-structures, and exploits repetitive patterns in texture images. The multi-stage model further includes skip connections 550 and 555 and convolution layers 510, 520, 530, and 540 to propagate and fuse the information at different stages (which also improves the network capacity).

In a non-limiting example, the encoder 500 brings an input image (of 3 channels, e.g., 128×128×3) to image features (of 16 channels, e.g., 128×128×16) of the same spatial extent as the input image with convolutions.

The first Transformer block 505 takes a coarse partition (spatial partition) of the image features, for example, partitioning the image feature into 4 (2×2) pieces (feature patches) of size 64×64×16, and 4 becomes the sequence dimension for the input sequence of the first transformer block 505. Going through the first transformer block 505, the input sequence of patches is mapped to the output patch sequence with a nonlinear weighted combination (each output patch is formed by a combination and transformation of all the input patches, as described in more detail herein, for example, with reference to FIG. 8). The output sequence of patches is then placed back together (e.g., combined) to obtain combined output features of size 128×128×16.

Before the second transformer block 515, a convolution operation may be performed on the combined output features from the first transformer block 505. For example, a "Cony Down-1" operation may include first convolution layers 510 (e.g., two convolution layers) that shrink the spatial extent of the image feature maps and enlarge the channel dimension by at least 2 times (e.g., 128×128×16 to 64×64×32 with kernel size=4, stride=2, input channel=16, output channel=32). Therefore, the overall feature map size is changed for the second transformer block 515.

The second transformer block 515 takes a finer partition of the input feature maps, for example, partitioning (e.g., or segmenting) the feature maps (64×64×32) to 16 (4×4) patches of size 16×16×32. Similarly, the transformer block 515 takes a sequence of 16 patches of size 16×16×32 and maps them to the output sequence of 16 patches of size 16×16×32. The output sequence of patches is then placed back together to be of size 64×64×32.

Before going to the third transformer block 525, another convolution operation (e.g. a "Cony Down-2" operation, performed via second convolutional layers 520) transforms the input of size 64×64×32 to 32×32×64.

The third transformer block 525 takes an even finer partition of the feature maps (32×32×64) from "Cony Down-2" operation, which is to partition them into 64 (8×8) patches of size 4×4×64. The third transformer block 525 maps the newly partitioned patches to another sequence of patches of the same size. Placing (e.g., combining) the patches together, an output sequence of feature patches of size 32×32×64 may be obtained.

Another convolution operation (e.g., a "Cony Up-1" operation, performed via third convolutional layers 530) takes the input of size 32×32×64 and gives the output of size 64×64×32 by enlarging the spatial extent and shrinking the channel dimension (opposite operation of "Cony Down" operations performed via first convolutional layers 510 and second convolutional layers 520).

The output of "Cony Up-1" (64×64×32) and the output of the second transformer block 515 (64×64×32) are concatenated to be of size 64×64×64. In some embodiments, after concatenation, the feature maps go through 2 convolution layers (e.g., a "Cony Fuse-1" network after the second skip connection 555) that halves the channel dimension, and provides an output of 64×64×32. This step propagates high-frequency information with skip connection 555 and fuses high and low-frequency information with convolutions.

The fourth transformer block 535 takes image feature maps of size 64×64×32, and partitions them into 16 (4×4) patches of size 16×16×32 (e.g., which may be the same scale partitioning as the second transformer block 515). The patches in the output sequence are placed together after processing with the fourth transformer block 535 and become the output of size 64×64×32.

A "Cony Up-2" operation (e.g., via convolutional layers 540) takes the input of size 64×64×32 and gives the output of size 128×128×16 by enlarging the spatial extent and halving the channel dimension.

The output of the "Cony Up-2" operation (128×128×16) and the output of the first transformer block 505 (128×128× 16) may be concatenated to be of size 128×128×32. In some embodiments, after concatenation, the feature maps go through 2 convolution layers (e.g., a "Cony Fuse-2" network after the first skip connection 550) that halves the channel dimension, and provides an output of 128×128×16.

In some embodiments, the "Conv-Fuse 1" (e.g., 2 convolutional layers) combines or fuses the output from the second transformer block 515 and the output from the convolutional layers 530 (Conv-Up 1) by concatenation and convolution to generate the input for the fourth transformer block 535. Similarly, "Conv-Fuse 2" combines or fuses the output from the first transformer block 505 and the output from the convolutional layers 540 (Conv-Up 2) by concatenation and convolution to generate the input for the fifth transformer block. Thus, the skip connections 550 and 555 may include skip connection, concatenation, and convolution operations.

The fifth transformer block 545 takes the input of size 128×128×16, and similarly to the first transformer block 505, partitions them into 4 (2×2) patches of size 64×64×16, and mapping them to 4 patches of size 64×64×16. Placing the output patches together gives the output of size 128× 128×16.

Finally, the decoder 560 brings the feature maps of size 128×128×16 to the image domain of size 128×128×3, which becomes the modified image that is successfully in-painted with the synthetic texture.

One or more embodiments of the disclosure include a pre-processing step with no padding outside borders. In some cases, the region to be in-painted could be internal.

One or more embodiments of the disclosure include an attention network configured to perform texture transfer. In some cases, textures have statistically coherent properties. For example, a high-level block (e.g., fifth transformer block 545) enables removal of discontinuities from a previous small block (e.g., third transformer block 525). Different block levels (e.g., different stages or different transformer blocks) may include scale variations or overlapping scales (i.e., jittering between scales).

Some embodiments of the present disclosure include a network design that includes a baseline structure. A baseline structure may include an encoder 500, transformer blocks (e.g., first transformer block 505, second transformer block 515, third transformer block 525, fourth transformer block 535, fifth transformer block 545), a decoder 560, and a patch GAN for the GAN loss. In some cases, feature maps are placed after the encoder 500. The feature maps are rearranged to sequences of patches as inputs for the transformer blocks. A decoder 560 brings the output sequence of patches from transformers to the image domain.

A baseline network may establish a learned patch mapping for texture expansion with the self-attention mechanism between input patches. One or more embodiments of the present disclosure use a coarse-to-fine network with the baseline network (e.g., first transformer block 505, second transformer block 515, and third transformer block 525). In some cases, the coarse-to-fine network combines attention between large patches for global patterns and attention between small patches for local refinement of patch mapping.

One or more embodiments of the disclosure include a multi-stage pyramid transformer network that progressively processes patches with small spatial extents at advanced stages of the network. The network progressively reduces the patch size and formulates long sequences as the input for transformer blocks. For example, the reduction is similar to a pyramid structure for consecutive transformer stages (e.g., for first transformer block 505, second transformer block 515, and third transformer block 525 stages). In some cases, the pyramid network may present blocking artifacts with a low number of stages. For example, the last stage of the transformer may take sequences of patches of size 1×1 as input, and the corresponding results could be free of blocking artifacts.

In some cases, a transformer block takes a sequence of patches as input to provide a weighted sum of previous patches as output (i.e., sequence of patches–each patch=weighted sum of previous patches).

One or more embodiments of the disclosure include an hourglass transformer network that mirrors the pyramid network for a coarse-to-fine (e.g., first transformer block 505, second transformer block 515, and third transformer block 525) scheme and a fine-back-to-coarse (e.g., third transformer block 525, fourth transformer block 535, and fifth transformer block 545) scheme. In some examples, the hourglass network is formed using input patches of large-to-small and small-to-large scales at different stages of the hourglass. The hourglass backbone concatenates a pyramid network and a mirrored pyramid network. The mirrored pyramid network takes progressively larger patches with short sequence lengths as inputs for advanced transformer stages. In some cases, the hourglass transformer network increases computational efficiency. The fine-back-to-coarse part of the network (e.g., third transformer block 525, fourth transformer block 535, and fifth transformer block 545) enables further regularization of small output patches at the bottleneck of the hourglass, and resolves the blocking artifacts with memory-efficient transformer blocks that take short sequences of large patches as inputs.

One or more embodiments of the disclosure include a U-Attention network that adds skip connections (e.g., first skip connection 550 and second skip connection 555) and convolutional layers (e.g., first convolutional layers 510, second convolutional layers 520, third convolutional layers 530, and fourth convolutional layers 540) between the hourglass transformers. The step increases the capacity of the network and increases the performance of texture image generation. In some cases, skip connections and convolutional layers are added between different stages of transformers for information propagation and fusion. Skip connections propagate high-frequency outputs from early stages to late stages.

For example, skip connections concatenate the high-frequency outputs with low-frequency outputs at late stages. The convolutional layers with strides fuse the concatenated features from skip connections for further processing. In some cases, convolutional layers are added between early stages of the network for symmetry of the network and to increase the network capacity. The skip connections and convolutional layers make the overall network architecture resemble a U-Net, hence the name U-Attention.

Skip connections (e.g., first skip connection 550, second skip connection 555, etc.) and convolutional layers (e.g., first convolutional layers 510, second convolutional layers 520, third convolutional layers 530, fourth convolutional layers 540, etc.) between transformer blocks (e.g., first transformer block 505, second transformer block 515, third transformer block 525, fourth transformer block 535, and fifth transformer block 545) propagate and fuse high-frequency and low-frequency features from different transformer stages.

The texture synthesis model may enable texture synthesis with one trained network universal to a broad range of texture patterns. For example, the model may generate images that are twice of the original image in size. In some cases, the network may include different textures from one family, cross family texture images with varying amounts of randomness and structure, and textures like structural brick walls at different angles. The trained network performs real-time texture synthesis with minimum user dependence at testing time.

In some aspects, transformer blocks may be referred to herein as attention networks. For example, in some aspects, second transformer block 515 may be referred to as a first attention network; third transformer block 525 may be referred to as a second attention network; fourth transformer block 535 may be referred to as a third attention network; first transformer block 505 may be referred to as a fourth attention network; and fifth transformer block 545 may be referred to as a fifth attention network.

Moreover, in some aspects, convolutional layers may be referred to herein as convolutional networks. For example, in some aspects, second convolutional layers 520 may be referred to as a first convolutional network; third convolutional layers 530 may be referred to as a second convolutional network; fourth convolutional layers 540 may be referred to as a third convolutional network; and first convolutional layers 510 may be referred to as a fourth convolutional network.

In some aspects, image processing techniques may include image segmentation, which may include partitioning input image (or combined input features) into multiple segments (e.g., sets of pixels, also known as image objects). In digital imaging, a pixel (or picture element) refers to the smallest addressable element in a display device, and the smallest controllable element of a picture represented on the device. In some cases, each pixel may represent a sample of an original image. The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics. For instance, input features may be partitioned to obtain input sequences used for subsequent stages of the multi-stage attention model.

In some aspects, an object detection network may be used to classify objects using categorical labels and localize objects present in images. Object detection can be performed and evaluated by mean average precision, a metric taking into account a quality of classification and localization.

Encoder 500 is an example of, or includes aspects of, the corresponding element described with reference to FIG. 4. Decoder 560 is an example of, or includes aspects of, the corresponding element described with reference to FIG. 4.

Texture Synthesis

Figure 6:
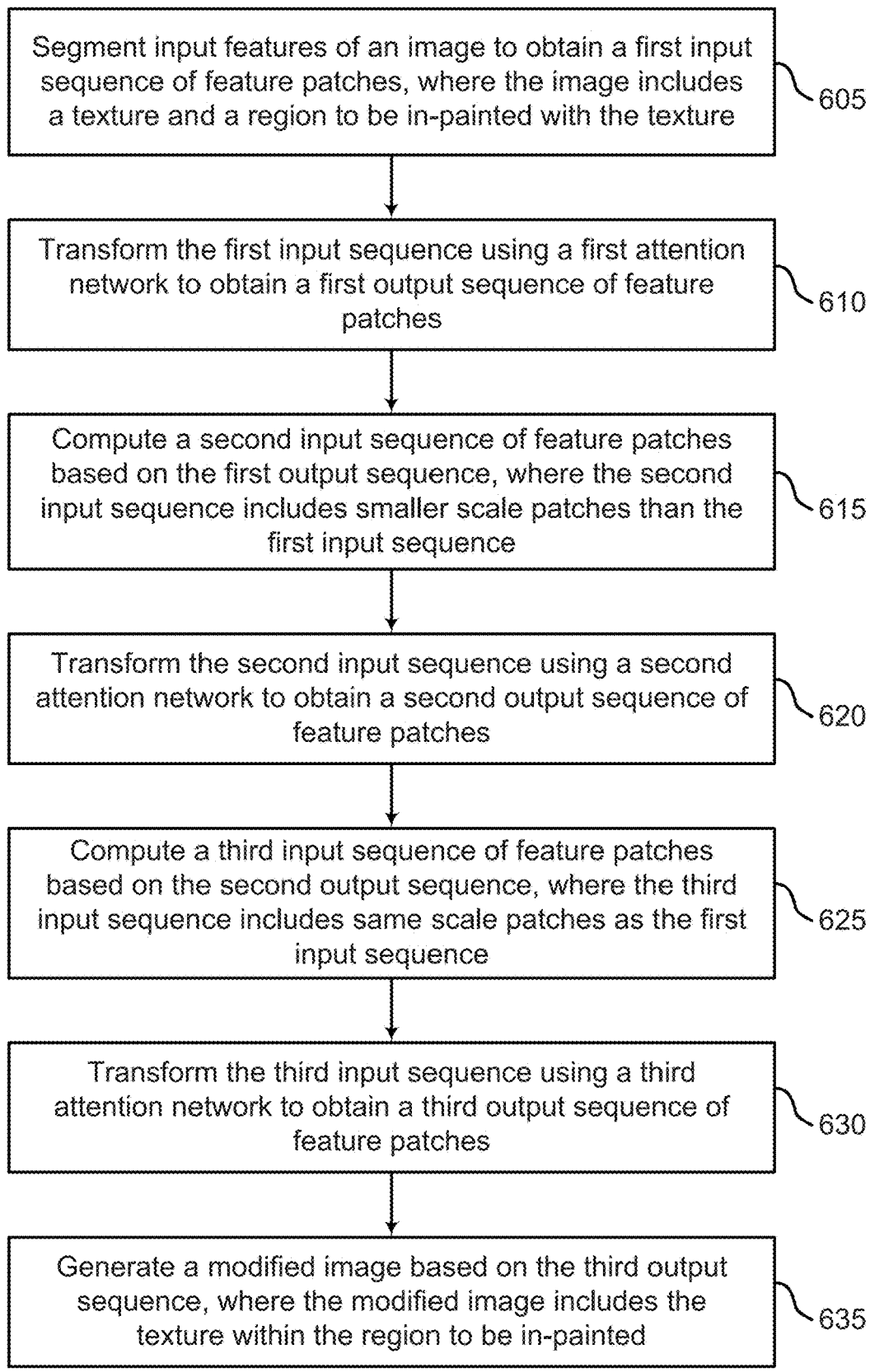
FIG. 6 shows an example of a method for image processing according to aspects of the present disclosure.

FIG. 6 shows an example of a method 600 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method, apparatus, non-transitory computer readable medium, and system for multi-stage attention model for texture synthesis is described. One or more aspects of the method, apparatus, non-transitory computer readable medium, and system include segmenting input features of an image to obtain a first input sequence of feature patches, wherein the image comprises a texture and a region to be in-painted with the texture, and transforming the first input sequence using a first attention network to obtain a first output sequence of feature patches.

One or more aspects of the method, apparatus, non-transitory computer readable medium, and system further include computing a second input sequence of feature patches based on the first output sequence, wherein the second input sequence comprises smaller scale patches than the first input sequence, and transforming the second input sequence using a second attention network to obtain a second output sequence of feature patches. One or more aspects of the method, apparatus, non-transitory computer readable medium, and system further include computing a third input sequence of feature patches based on the second output sequence, wherein the third input sequence comprises same scale patches as the first input sequence. One or more aspects of the method, apparatus, non-transitory computer readable medium, and system further include transforming the third input sequence using a third attention network to obtain a third output sequence of feature patches, and generating a modified image based on the third output sequence, wherein the modified image comprises the texture within the region to be in-painted.

At operation 605, the system segments input features of an image to obtain a first input sequence of feature patches, where the image includes a texture and a region to be in-painted with the texture. For example, an image including a texture may be encoded to generate a multi-dimensional vector representation of the image. The encoded multi-dimensional vector represents input feature of the image. The system may then segment the multi-dimensional vector to obtain the first input sequence of feature patches. For instance, the encoded vector representation of the image may be segmented into an input sequence of, for example, 4 feature patches, 16 feature patches, 64 feature patches, etc. (e.g., as further described herein, for example, with reference to FIG. 5). In some cases, the operations of this step refer to, or may be performed by, an image processing apparatus as described with reference to FIGS. 1 and 4.

At operation 610, the system transforms the first input sequence using a first attention network to obtain a first output sequence of feature patches. That is, the first attention network may generate output patches based on weighted elements of the first input sequence, where the weighting of elements is based on an attention map. In other words, each element of the first output sequence of feature patches is obtained based on weighted combinations of the first input sequence defined by attention maps implemented by the first attention network (e.g., as described in more detail herein, for example, with reference to FIG. 8). In some cases, the operations of this step refer to, or may be performed by, a first attention network as described with reference to FIG. 4 and/or a second transformer block 515 as described with reference to FIG. 5.

At operation 615, the system computes a second input sequence of feature patches based on the first output sequence, where the second input sequence includes smaller scale patches than the first input sequence. In some aspects, the second input sequence of feature patches is computed by combining output patches of the first output sequence to obtain first combined output features (e.g., where the combined feature patches represent the structure or properties of the original input image). A first convolution operation is performed on the first combined output features (e.g., as further described herein, for example, with reference to FIG. 4) to obtain second combined input features. The second combined input features are then segmented to obtain a second input sequence for the next stage of the multi-stage attention model (e.g., as further described herein, for example, with reference to FIG. 5). The second input sequence includes smaller scale patches than the first input sequence, as the first convolution operation (e.g., a convolution down operation) may reduce the spatial extent of the first combined output features and enlarge the channel dimension (e.g., and the second input sequence includes smaller scale patches for the next stage). In some cases, the operations of this step refer to, or may be performed by, a first convolution network as described with reference to FIG. 4 and/or second convolutional layers 520 as described with reference to FIG. 5.

At operation 620, the system transforms the second input sequence using a second attention network to obtain a second output sequence of feature patches. That is, the second input sequence (e.g., computed by the first convolution network from the output of the first attention network) is processed by a second attention network to generate a second sequence of output patches based on weighted elements of the second input sequence, where the weighting of elements is based on attention maps implemented by the second attention network (e.g., as further described herein, for example, with reference to FIGS. 5 and 8). Further, in some cases, the operations of this step refer to, or may be performed by, a second attention network as described with reference to FIG. 4 and/or a third transformer block 525 as described with reference to FIG. 5.

At operation 625, the system computes a third input sequence of feature patches based on the second output sequence, where the third input sequence includes same scale patches as the first input sequence. The third input sequence of feature patches is computed by combining output patches of the second output sequence to obtain second combined output features. A second convolution operation is performed on the second combined output features to obtain third combined input features (e.g., that are segmented to obtain the third input sequence). In some aspects, the third input sequence includes same scale patches as the first input sequence, as the second convolution operation (e.g., a convolution up operation) may increase the spatial extent of the second combined output features and reduce the channel dimension (e.g., and the third input sequence includes same scale patches, as the previous stage, for the next stage). In some cases, the operations of this step refer to, or may be performed by, a second convolution network as described with reference to FIG. 4 and/or third convolutional layers 530 as described with reference to FIG. 5.

At operation 630, the system transforms the third input sequence using a third attention network to obtain a third output sequence of feature patches. That is, the third input sequence (e.g., computed by the second convolution network from the output of the second attention network) is processed by a third attention network to generate a third sequence of output patches based on weighted elements of the third input sequence, where the weighting of elements is based on attention maps implemented by the third attention network. In some cases, the operations of this step refer to, or may be performed by, a third attention network as described with reference to FIG. 4 and/or a fourth transformer block 535 as described with reference to FIG. 5.

At operation 635, the system generates a modified image based on the third output sequence, where the modified image includes the texture within the region to be in-painted. For example, the third output sequence may be decoded to reconstruct a modified image that includes the region (that is to be in-painted) in-painted with the texture of the input image. In some examples, the third output sequence may be passed through an additional convolution network and an additional attention network, and a resulting fourth output sequence may be decoded to reconstruct the modified image (e.g., as described in more detail herein, for example, with reference to FIG. 5). In some cases, the operations of this step refer to, or may be performed by, a decoder as described with reference to FIGS. 4 and 5.

Some examples of the method, apparatus, non-transitory computer readable medium, and system described herein further include combining the first output sequence to obtain first combined output features. Some examples further include performing a first convolution operation on the first combined output features to obtain second combined input features. Some examples further include segmenting the second combined input features to obtain the second input sequence, wherein the second input sequence comprises a larger number of feature patches than the first input sequence.

Some examples of the method, apparatus, non-transitory computer readable medium, and system further include combining the second output sequence to obtain second combined output features. Some examples further include performing a second convolution operation on the second combined output features to obtain third combined input features. Some examples further include segmenting the third combined input features to obtain the third input sequence, wherein the third input sequence comprises a same number of features patches as the first input sequence.

Some examples of the method, apparatus, non-transitory computer readable medium, and system further include expanding an input image with zero-padding along a border of the image to create the image comprising the region to be in-painted. Some examples of the method, apparatus, non-transitory computer readable medium, and system further include providing the first output sequence together with the third input sequence as an input to the third attention network to obtain the third output sequence.

Some examples of the method, apparatus, non-transitory computer readable medium, and system further include segmenting initial features of the image to obtain a fourth input sequence of feature patches, wherein the fourth input sequence comprises larger scale patches than the first input sequence. Some examples further include transforming the fourth input sequence using a fourth attention network to obtain a fourth output sequence of feature patches. Some examples further include computing the first input sequence based on the fourth output sequence. Some examples further include computing a fifth input sequence of feature patches based on the third output sequence, wherein the fifth input sequence comprises same scale patches as the first input sequence. Some examples further include transforming the fifth input sequence using a fifth attention network to obtain a fifth output sequence, wherein the modified image is generated based on the fifth output sequence.

Some examples of the method, apparatus, non-transitory computer readable medium, and system further include providing the fourth output sequence as an input to the fifth attention network to obtain the fifth output sequence.

Figure 7:
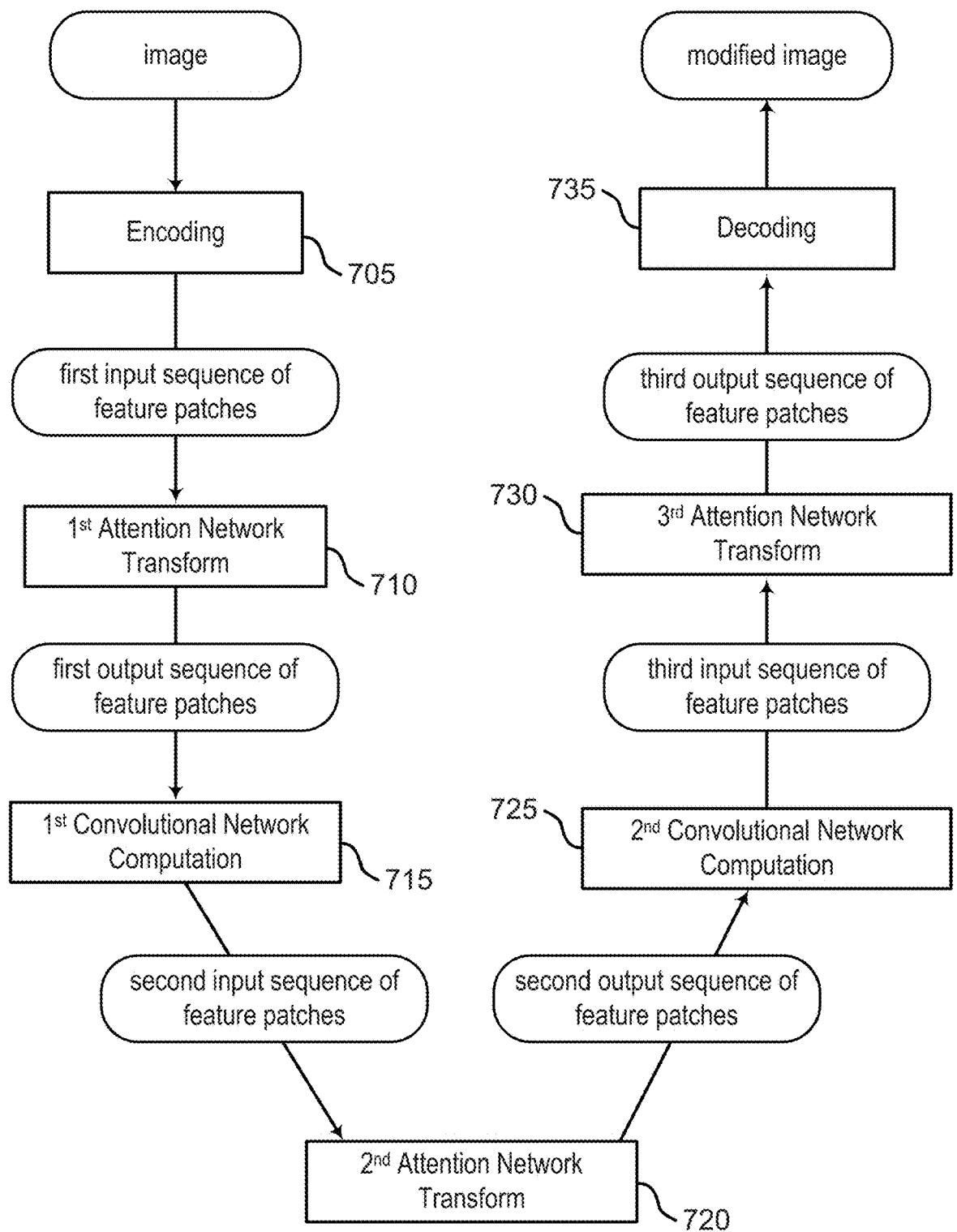
FIG. 7 shows an example of an image editing method according to aspects of the present disclosure.

FIG. 7 shows an example of an image editing process 700 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure include an attention map visualization and real-time texture synthesis. In some cases, the texture synthesis is performed at a high speed and may be applied to multiple textures (e.g., the texture synthesis techniques may be generally applied to different texture classes).

At operation 705, the system generates input features for an input image (for example, where the input image includes a texture and a region to be in-painted with the texture). In some cases, the operations of this step refer to, or may be performed by, an encoder as described with reference to FIGS. 4 and 5.

At operation 710, the system transforms a first input sequence of feature patches to obtain a first output sequence of feature patches, where the first input sequence of feature patches is based on segmenting the generated input features of the input image. In some cases, the operations of this step refer to, or may be performed by, a first attention network as described with reference to FIG. 4.

At operation 715, the system computes a second input sequence of feature patches based on the first output sequence of feature patches, where the second input sequence of feature patches includes smaller scale patches than the first input sequence of feature patches. In some cases, the operations of this step refer to, or may be performed by, a first convolution network as described with reference to FIG. 4.

At operation 720, the system transforms the second input sequence of feature patches to obtain a second output sequence of feature patches. In some cases, the operations of this step refer to, or may be performed by, a second attention network as described with reference to FIG. 4.

At operation 725, the system computes a third input sequence of feature patches based on the second output sequence of feature patches, where the third input sequence of feature patches includes same scale patches as the first input sequence of feature patches. In some cases, the operations of this step refer to, or may be performed by, a second convolution network as described with reference to FIG. 4.

At operation 730, the system transforms the third input sequence of feature patches to obtain a third output sequence of feature patches. In some cases, the operations of this step refer to, or may be performed by, a third attention network as described with reference to FIG. 4.

At operation 735, the system generates a modified image based on the third output sequence of feature patches (for example, where the modified image includes the input image texture and the region in-painted with the texture). In some cases, the operations of this step refer to, or may be performed by, a decoder as described with reference to FIGS. 4 and 5.

Figure 8:
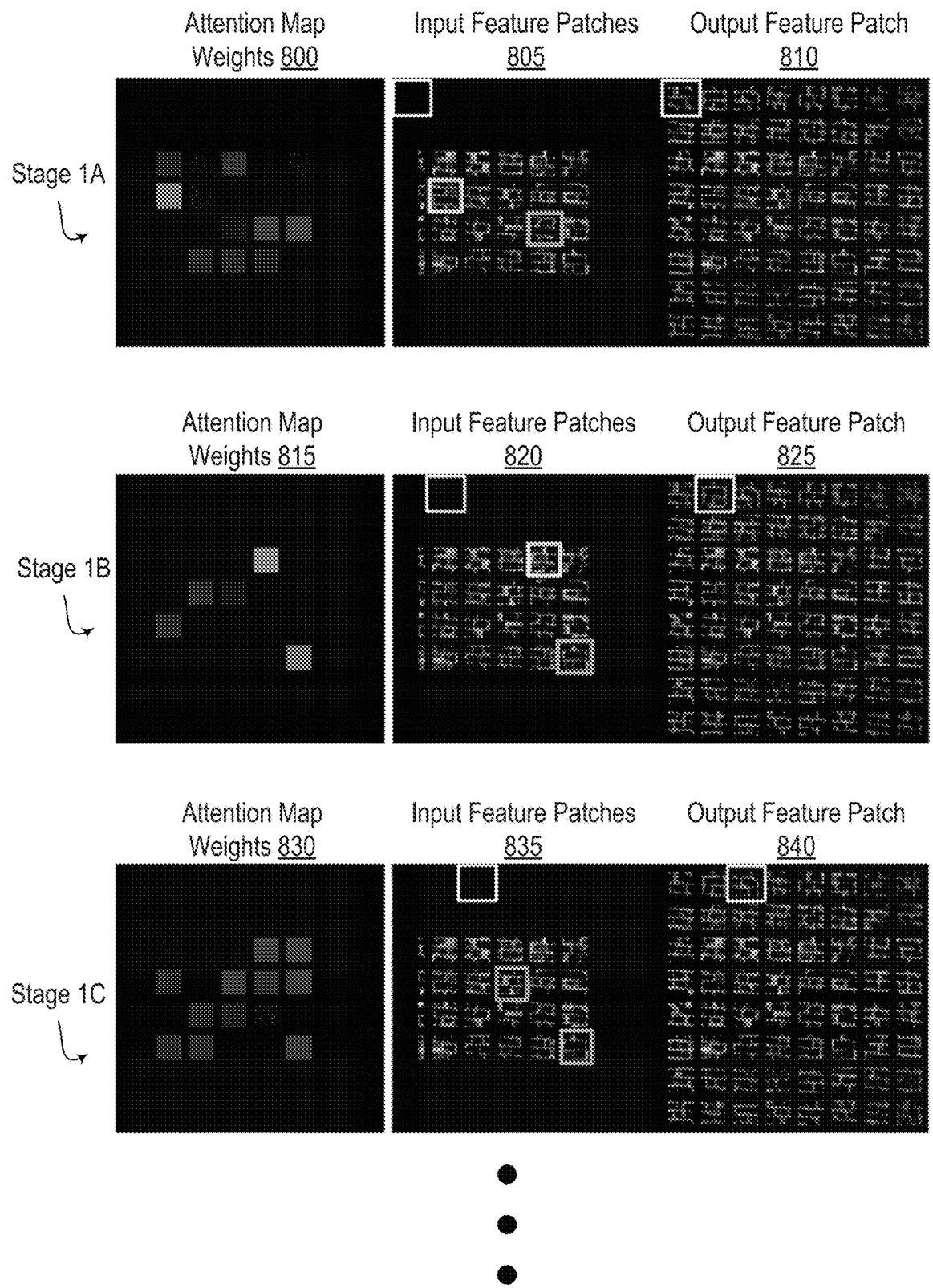
FIG. 8 shows an example of a stage of a multi-stage attention model according to aspects of the present disclosure.

FIG. 8 shows an example of a stage of a multi-stage attention model according to aspects of the present disclosure. The example shown includes three aspects of a stage, for illustrative purposes. As described herein For instance, a first aspect of a stage (Stage 1A) includes attention map weights 800, input feature patches 805, and output feature patch 810; a second aspect of a stage (Stage 1B) includes attention map weights 815, input feature patches 820, and output feature patch 825; and a third aspect of a stage (Stage 1C) includes attention map weights 830, input feature patches 835, and output feature patch 840.

FIG. 8 illustrates an embodiment of the disclosure that includes the learned patch mapping for one stage of a multi-stage attention model. As described herein, an output patch is generated with a weighted combination of the input patch features, and the weights are determined by attention maps.

For example, FIG. 8 shows a stage including stage 1A, stage 1B, and stage 1C (e.g., as well as several additional stages that are not shown for the sake of simplicity and ease of explanation). Stage 1A, stage 1B, and stage 1C combined may form a single state of a U-shaped attention network, such as the $3^{rd}$ stage 940 described with reference to FIG. 9.

Stage 1A shows output feature patch 810 generated based on a weighted combination of input feature patches 805 defined by attention map weights 800. Stage 1B shows output feature patch 825 (e.g., a next output feature patch) generated based on a weighted combination of input feature patches 820 defined by attention map weights 815. Stage 1C shows output feature patch 840 generated based on a weighted combination of input feature patches 835 defined by attention map weights 830.

As described herein, a stage (e.g., a transformer block stage, or an attention network stage, of a multi-stage attention model) includes mapping an input sequence of feature patches to an output sequence of feature patches based on a nonlinear weighted combination (e.g., based on attention map weights 800, 815, 830, etc.) of the input sequence of feature patches. That is, each output feature patch (e.g., output feature patch 810, 825, 840, etc.) is formed by a combination and transformation of the input patches (e.g., input feature patches 805, 820, 835, etc.), respectively. Next, the output sequence of patches is placed together (e.g., in the example of FIG. 8, resulting in the 64 (e.g., 8×8) sequence of output feature patches).

Through the multi-stage attention model, the output sequence of feature patches (e.g., a sequence of combine output feature patch 810, 825, 840, etc.) may be taken as an input sequence of feature patches (e.g., after a convolution operation) to a subsequent stage of the multi-stage attention model (e.g., which may enable implementation of coarse-to-fine and fine-back-to-coarse scale feature patch mapping, as described in more detail herein).

Figure 9:
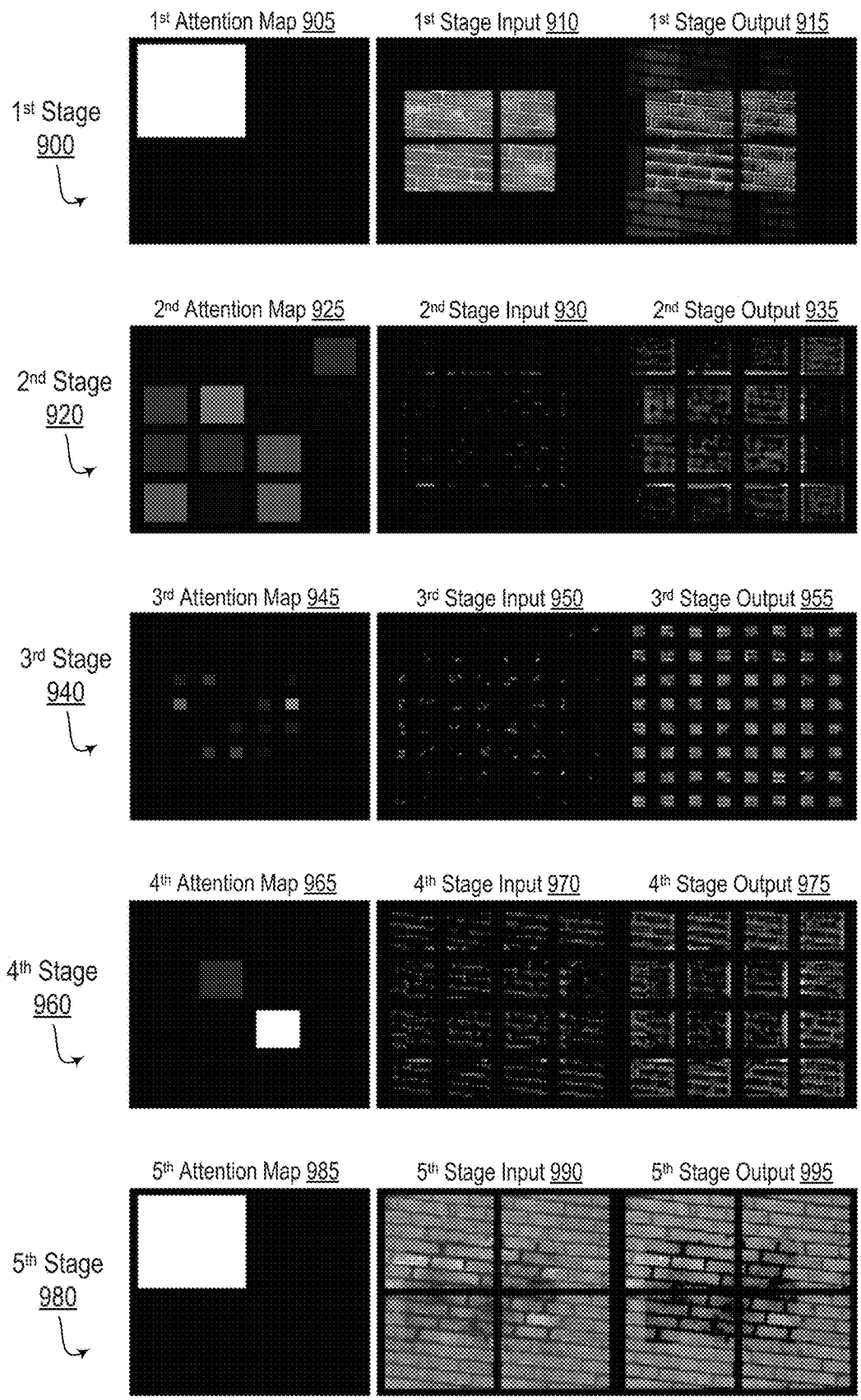
FIG. 9 shows an example of multiple stages of a multi-stage attention model according to aspects of the present disclosure.

FIG. 9 shows an example of multiple stages of a multi-stage attention model according to aspects of the present disclosure. The example shown includes first stage 900, second stage 920, third stage 940, fourth stage 960, and fifth stage 980.

In one aspect, first stage 900 includes first attention map 905, first stage input 910, and first stage output 915. In one aspect, second stage 920 includes second attention map 925, second stage input 930, and second stage output 935. In one aspect, third stage 940 includes third attention map 945, third stage input 950, and third stage output 955. In one aspect, fourth stage 960 includes fourth attention map 965, fourth stage input 970, and fourth stage output 975. In one aspect, fifth stage 980 includes fifth attention map 985, fifth stage input 990, and fifth stage output 995.

A multi-stage attention model for different scale patch mappings at each stage includes progressive refinement of the patch mapping process at different scales with coarse-to-fine and fine-back-to-coarse schemes (e.g., as described in more detail herein). The example of FIG. 9 illustrates aspects of such coarse-to-fine and fine-back-to-coarse schemes.

For instance, stages 900, 920, and 940 may illustrate aspects of coarse-to-fine feature patch mapping. Stage 900 takes a coarse partition (spatial partition) of the image features, for example, partitioning the image feature into 4 (2×2) pieces of size 64×64×16 (e.g., and 4 becomes the sequence dimension for the first stage, which may be implemented by a first transformer block 505 described with reference to FIG. 5). The first stage input 910 (e.g., an input sequence of feature patches) is mapped to the first stage output 915 (e.g. an output sequence of feature patches) with a nonlinear weighted combination based on first attention map 905 (e.g., and the first stage output 915 is combined into the output sequence of feature patches to be of size 128×128×16). The coarse-to-fine scheme of stages 900, 920, and 940 progresses through stage 920 and ultimately to stage 940, where at stage 940 a fine partition (spatial partition) of the image features is taken, for example, partitioning the image feature into 64 (8×8) feature patches. For instance, 64 becomes the sequence dimension for the third stage 940, which may be implemented by a third transformer block 525 described with reference to FIG. 5).

Stages 940, 960, and 980 may illustrate aspects of fine-back-to-coarse feature patch mapping. For example, inverse to the coarse-to-fine scheme described above, the fine-back-to-coarse scheme takes fine partitions of image features at the third stage 940 and ultimately takes coarse partitions of image features at the fifth stage 980 (e.g., as shown, for example, with reference to FIG. 9).

In some aspects, first stage 900 may be an example of, or may be performed by, first transformer block 505 described with reference to FIG. 5. Second stage 920 may be an example of, or may be performed by, second transformer block 515 described with reference to FIG. 5. Third stage 940 may be an example of, or may be performed by, third transformer block 525 described with reference to FIG. 5. Fourth stage 960 may be an example of, or may be performed by, fourth transformer block 535 described with reference to FIG. 5. Fifth stage 980 may be an example of, or may be performed by, fifth transformer block 545 described with reference to FIG. 5.

Training

Figure 10:
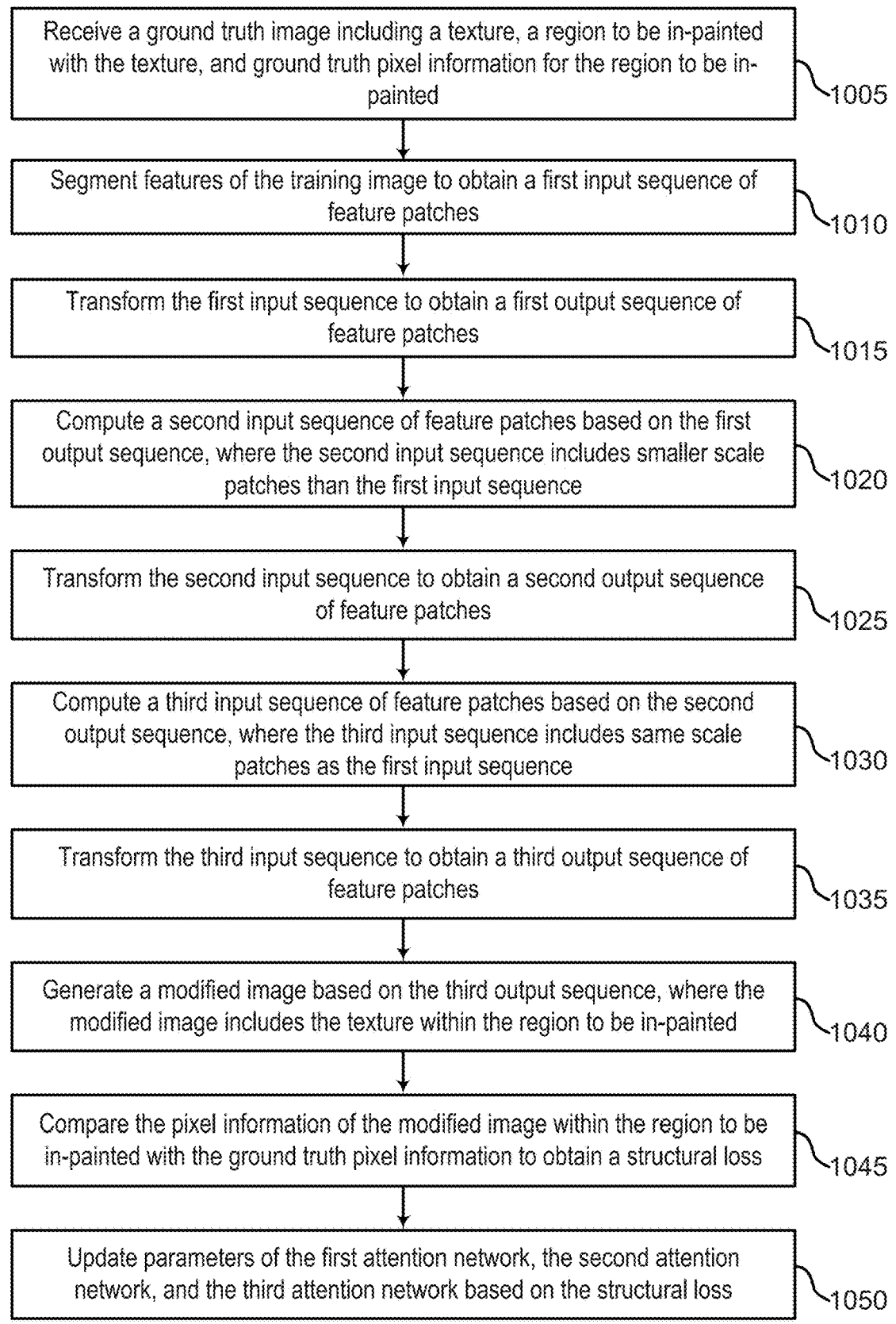
FIG. 10 shows an example of a method for image processing according to aspects of the present disclosure.

FIG. 10 shows an example of a method 1000 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method, apparatus, non-transitory computer readable medium, and system for multi-stage attention model for texture synthesis is described. One or more aspects of the method, apparatus, non-transitory computer readable medium, and system include receiving a ground truth image comprising a texture, a region to be in-painted with the texture, and ground truth pixel information for the region to be in-painted; and segmenting features of the training image to obtain a first input sequence of feature patches. One or more aspects of the method, apparatus, non-transitory computer readable medium, and system further include transforming the first input sequence using a first attention network to obtain a first output sequence of feature patches; and computing a second input sequence of feature patches based on the first output sequence, wherein the second input sequence comprises smaller scale patches than the first input sequence. One or more aspects of the method, apparatus, non-transitory computer readable medium, and system further include transforming the second input sequence using a second attention network to obtain a second output sequence of feature patches; and computing a third input sequence of feature patches based on the second output sequence, wherein the third input sequence comprises same scale patches as the first input sequence.

One or more aspects of the method, apparatus, non-transitory computer readable medium, and system further include transforming the third input sequence using a third attention network to obtain a third output sequence of feature patches; and generating a modified image based on the third output sequence, wherein the modified image comprises the texture within the region to be in-painted. One or more aspects of the method, apparatus, non-transitory computer readable medium, and system further include comparing the pixel information of the modified image within the region to be in-painted with the ground truth pixel information to obtain a structural loss; and updating parameters of the first attention network, the second attention network, and the third attention network based on the structural loss.

For example, at operation 1005, the system receives a ground truth image including a texture, a region to be in-painted with the texture, and ground truth pixel information for the region to be in-painted. In some cases, the operations of this step refer to, or may be performed by, a training component as described with reference to FIG. 4.

At operation 1010, the system segments features of the training image to obtain a first input sequence of feature patches. In some cases, the operations of this step refer to, or may be performed by, an image processing apparatus as described with reference to FIGS. 1 and 4.

At operation 1015, the system transforms the first input sequence to obtain a first output sequence of feature patches. In some cases, the operations of this step refer to, or may be performed by, a first attention network as described with reference to FIG. 4.

At operation 1020, the system computes a second input sequence of feature patches based on the first output sequence, where the second input sequence includes smaller scale patches than the first input sequence. In some cases, the operations of this step refer to, or may be performed by, a first convolution network as described with reference to FIG. 4.

At operation 1025, the system transforms the second input sequence to obtain a second output sequence of feature patches. In some cases, the operations of this step refer to, or may be performed by, a second attention network as described with reference to FIG. 4.

At operation 1030, the system computes a third input sequence of feature patches based on the second output sequence, where the third input sequence includes same scale patches as the first input sequence. In some cases, the operations of this step refer to, or may be performed by, a second convolution network as described with reference to FIG. 4.

At operation 1035, the system transforms the third input sequence to obtain a third output sequence of feature patches. In some cases, the operations of this step refer to, or may be performed by, a third attention network as described with reference to FIG. 4.

At operation 1040, the system generates a modified image based on the third output sequence, where the modified image includes the texture within the region to be in-painted. In some cases, the operations of this step refer to, or may be performed by, a decoder as described with reference to FIGS. 4 and 5.

At operation 1045, the system compares the pixel information of the modified image within the region to be in-painted with the ground truth pixel information to obtain a loss function including a structural loss. In some cases, the operations of this step refer to, or may be performed by, a training component as described with reference to FIG. 4.

At operation 1050, the system updates parameters of the first attention network, the second attention network, and the third attention network based on the structural loss. In some cases, the operations of this step refer to, or may be performed by, a training component as described with reference to FIG. 4.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In some embodiments, a loss function is used that includes structural L1 loss, VGG-based perceptual loss, style loss, and a patch GAN loss. In some examples, the L1 loss is measured by performing a comparison to ground truth. The VGG-based perpetual loss compares encoded version of output and ground truth. Additionally, a style loss performs statistical (i.e., not pixel-wise matching), and a patch GAN loss evaluates if the patch is ground truth or generated.

A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator networks training objective is to increase the error rate of the discriminator network (i.e., to produce novel candidates that the discriminator network classifies as real).

Some examples of the method, apparatus, non-transitory computer readable medium, and system described herein further include combining the first output sequence to obtain first combined output features. Some examples further include performing a first convolution operation on the first combined output features using a first convolution network to obtain second combined input features. Some examples further include segmenting the second combined input features to obtain the second input sequence, wherein the second input sequence comprises a larger number of feature patches than the first input sequence.

Some examples further include combining the second output sequence to obtain second combined output features. Some examples further include performing a second convolution operation on the second combined output features using a second convolution network to obtain third combined input features. Some examples further include segmenting the third combined input features to obtain the third input sequence, wherein the third input sequence comprises a same number of features patches as the first input sequence, and wherein parameters of the first convolution network and the second convolution network are updated based on the structural loss.

Some examples of the method, apparatus, non-transitory computer readable medium, and system further include encoding the ground truth image to obtain ground truth features. Some examples further include encoding the modified image to obtain modified image features. Some examples further include comparing the modified image features to the ground truth features to obtain a perceptual loss, wherein the parameters are updated based on the perceptual loss.

Some examples of the method, apparatus, non-transitory computer readable medium, and system further include generating statistical information for the ground truth image. Some examples further include generating statistical information for the modified image. Some examples further include comparing the statistical information for the ground truth image with the statistical information for the modified image to obtain a style loss, wherein the parameters of the first attention network, the second attention network, and the third attention network are updated based on the style loss.

Some examples of the method, apparatus, non-transitory computer readable medium, and system further include determining whether the modified image is an original image using a discriminator network. Some examples further include computing a generative adversarial network (GAN) loss based on the determination, wherein the parameters are updated based on the GAN loss.

Some examples of the method, apparatus, non-transitory computer readable medium, and system further include cropping an original image to obtain a training input image. Some examples further include padding a cropped portion of the original image with zeros to obtain the region to be in-painted, wherein the ground truth pixel information for the region to be in-painted is based on the cropped portion of the original image.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one".

What is claimed is:

1. A method for image in-painting using a computing device including at least one processor and at least one memory, comprising:
receiving, using the at least one memory, an image comprising a first region depicting a texture and a second region to be in-painted with the texture;
segmenting, using the at least one processor, input features of the image to obtain a first input sequence of feature patches, wherein each of the first input sequence of feature patches corresponds to a region of pixels in the image, and wherein a first patch of the first input sequence of feature patches corresponds to the first region depicting the texture and a second patch of the first input sequence of feature patches corresponds to the second region to be in-painted with the texture;
transforming, using the at least one processor, the first input sequence of feature patches using a first attention network to obtain a first output sequence of feature patches, wherein the first attention network constructs each of the first output sequence of feature patches based on a nonlinear mapping from the first input sequence of patches determined by an attention map between the first input sequence of patches and the first output sequence of feature patches;
computing, using the at least one processor, a second input sequence of feature patches by subdividing patches of the first output sequence of feature patches using a first convolution operation on the first output sequence of feature patches, wherein the second input sequence comprises more patches than the first output sequence of feature patches and smaller scale patches than the first output sequence of feature patches, and wherein individual patches of the second input sequence of feature patches correspond to fewer pixels of the image than the patches of the first output sequence of feature patches;
transforming, using the at least one processor, the second input sequence of feature patches using a second attention network to obtain a second output sequence of feature patches;
computing, using the at least one processor, a third input sequence of feature patches by combining patches of the second output sequence of feature patches using a second convolution operation on the second output sequence of feature patches, wherein the third input sequence of feature patches comprises fewer patches than the second output sequence of feature patches and same scale patches as the first output sequence of feature patches, and wherein individual patches of the third input sequence of feature patches correspond to more pixels of the image than the patches of the second output sequence of feature patches;
transforming, using the at least one processor, the third input sequence of feature patches using a third attention network to obtain a third output sequence of feature patches, wherein a first patch of the third input sequence of feature patches corresponds to the first region depicting the texture and a second patch of the third input sequence of feature patches corresponds to the second region and is in-painted with the texture; and
generating, using the at least one processor, a modified image by combining the third output sequence of feature patches, wherein the modified image comprises the texture within the region to be in-painted.

2. The method of claim 1, further comprising:
combining the first output sequence of feature patches to obtain first combined output features;
performing a first convolution operation on the first combined output features to obtain second combined input features; and
segmenting the second combined input features to obtain the second input sequence of feature patches, wherein the second input sequence of feature patches comprises a larger number of feature patches than the first input sequence of feature patches.

3. The method of claim 1, further comprising:
combining the second output sequence of feature patches to obtain second combined output features;
performing a second convolution operation on the second combined output features to obtain third combined input features; and
segmenting the third combined input features to obtain the third input sequence of feature patches, wherein the third input sequence of feature patches comprises a same number of features patches as the first input sequence of feature patches.

4. The method of claim 1, further comprising:
expanding an input image with zero-padding along a border of the image to create the image comprising the region to be in-painted.

5. The method of claim 1, further comprising:
providing the first output sequence of feature patches together with the third input sequence of feature patches as an input to the third attention network to obtain the third output sequence of feature patches.

6. The method of claim 1, further comprising:
segmenting initial features of the image to obtain a fourth input sequence of feature patches, wherein the fourth input sequence of feature patches comprises larger scale patches than the first input sequence of feature patches;
transforming the fourth input sequence of feature patches using a fourth attention network to obtain a fourth output sequence of feature patches;
computing the first input sequence of feature patches based on the fourth output sequence of feature patches;
computing a fifth input sequence of feature patches based on the third output sequence of feature patches, wherein the fifth input sequence of feature patches comprises same scale patches as the fourth input sequence of feature patches; and
transforming the fifth input sequence of feature patches using a fifth attention network to obtain a fifth output sequence of feature patches, wherein the modified image is generated based on the fifth output sequence of feature patches.

7. The method of claim 6, further comprising:
providing the fourth output sequence of feature patches together with the fifth input sequence of feature patches as an input to the fifth attention network to obtain the fifth output sequence of feature patches.

8. A method for training a machine learning model using a computing device including at least one processor and at least one memory, the method comprising:

receiving, using the at least one memory, a ground truth image comprising a first region depicting a texture, a second region to be in-painted with the texture, and ground truth pixel information for the region to be in-painted;

segmenting, using the at least one processor, features of the training image to obtain a first input sequence of feature patches, wherein each of the first input sequence of feature patches corresponds to a region of pixels in the ground truth image, and wherein a first patch of the first input sequence of feature patches corresponds to the first region depicting the texture and a second patch of the first input sequence of feature patches corresponds to the second region to be in-painted with the texture;

transforming, using the at least one processor, the first input sequence of feature patches using a first attention network to obtain a first output sequence of feature patches, wherein the first attention network constructs each of the first output sequence of feature patches based on a nonlinear mapping from the first input sequence of patches determined by an attention map between the first input sequence of patches and the first output sequence of feature patches;

computing, using the at least one processor, a second input sequence of feature patches by subdividing patches of the first output sequence of feature patches using a first convolution operation on the first output sequence of feature patches, wherein the second input sequence comprises more patches than the first output sequence of feature patches and smaller scale patches than the first output sequence of feature patches, wherein individual patches of the second input sequence of feature patches correspond to fewer pixels of the image than the patches of the first output sequence of feature patches;

transforming, using the at least one processor, the second input sequence of feature patches using a second attention network to obtain a second output sequence of feature patches;

computing, using the at least one processor, a third input sequence of feature patches by combining patches of the second output sequence of feature patches using a second convolution operation on the second output sequence of feature patches, wherein the third input sequence of feature patches comprises fewer patches than the second output sequence and same scale patches as the first output sequence of feature patches, wherein individual patches of the third input sequence of feature patches correspond to more pixels of the image than the patches of the second output sequence of feature patches;

transforming, using the at least one processor, the third input sequence of feature patches using a third attention network to obtain a third output sequence of feature patches, wherein a first patch of the third input sequence of feature patches corresponds to the first region depicting the texture and a second patch of the third input sequence of feature patches corresponds to the second region and is in-painted with the texture;

generating, using the at least one processor, a modified image by combining the third output sequence of feature patches, wherein the modified image comprises the texture within the region to be in-painted;

comparing, using the at least one processor, the pixel information of the modified image within the region to be in-painted with the ground truth pixel information to obtain a structural loss; and updating, using the at least one processor, parameters of the first attention network, the second attention network, and the third attention network based on the structural loss.

9. The method of claim 8, further comprising:

combining the first output sequence of feature patches to obtain first combined output features;

performing a first convolution operation on the first combined output features using a first convolution network to obtain second combined input features;

segmenting the second combined input features to obtain the second input sequence of feature patches, wherein the second input sequence of feature patches comprises a larger number of feature patches than the first input sequence of feature patches;

combining the second output sequence of feature patches to obtain second combined output features;

performing a second convolution operation on the second combined output features using a second convolution network to obtain third combined input features; and segmenting the third combined input features to obtain the third input sequence of feature patches, wherein the third input sequence of feature patches comprises a same number of features patches as the first input sequence of feature patches, and wherein parameters of the first convolution network and the second convolution network are updated based on the structural loss.

10. The method of claim 8, further comprising:

encoding the ground truth image to obtain ground truth features;

encoding the modified image to obtain modified image features; and comparing the modified image features to the ground truth features to obtain a perceptual loss, wherein the parameters are updated based on the perceptual loss.

11. The method of claim 8, further comprising:

generating statistical information for the ground truth image;

generating statistical information for the modified image; and comparing the statistical information for the ground truth image with the statistical information for the modified image to obtain a style loss, wherein the parameters of the first attention network, the second attention network, and the third attention network are updated based on the style loss.

12. The method of claim 8, further comprising:

determining whether the modified image is an original image using a discriminator network; and computing a generative adversarial network (GAN) loss based on the determination, wherein the parameters are updated based on the GAN loss.

13. The method of claim 8, further comprising:

cropping an original image to obtain a training input image; and padding a cropped portion of the original image with zeros to obtain the region to be in-painted, wherein the ground truth pixel information for the region to be in-painted is based on the cropped portion of the original image.

14. An apparatus for image in-painting, comprising:

at least one processor;

at least one memory component coupled with the at least one processor;

a first attention network configured to transform a first input sequence of feature patches of an image to obtain a first output sequence of feature patches, wherein the image comprises a first region depicting a texture and a second region to be in-painted with the texture, wherein a first patch of the first input sequence of feature patches corresponds to the first region depicting the texture and a second patch of the first input sequence of feature patches corresponds to the second region to be in-painted with the texture, wherein each of the first input sequence of feature patches corresponds to a region of pixels in the image, and wherein the first attention network constructs each of the first output sequence of feature patches based on a nonlinear mapping from the first input sequence of patches determined by an attention map between the first input sequence of patches and the first output sequence of feature patches;

a first convolution network configured to perform a first convolution operation by subdividing patches of first combined output features to obtain second combined input features, wherein the first combined output features comprise an arrangement of the first output sequence of feature patches;

a second attention network transforming a second input sequence of feature patches to obtain a second output sequence of feature patches, wherein the second input sequence of feature patches is based on the second combined input features, wherein the second input sequence comprises more patches than a first output sequence of feature patches and smaller scale patches than the first output sequence of feature patches, and wherein individual patches of the second input sequence of feature patches correspond to fewer pixels of the image than the patches of the first output sequence of feature patches;

a second convolution network configured to perform a second convolution operation by combining patches of second combined output features to obtain third combined input features, wherein the second combined output features comprise an arrangement of the second output sequence of feature patches;

a third attention network configured to transform a third input sequence of feature patches to obtain a third output sequence of feature patches, wherein a first patch of the third input sequence of feature patches corresponds to the first region depicting the texture and a second patch of the third input sequence of feature patches corresponds to the second region and is in-painted with the texture, wherein the third input sequence is based on the third combined input features, wherein the third input sequence of feature patches comprises fewer patches than the second output sequence and same scale patches as the first input sequence of feature patches, wherein individual patches of the third input sequence of feature patches correspond to more pixels of the image than the patches of the second output sequence of feature patches; and a decoder configured to generate a modified image by combining the third output sequence of feature patches, wherein the modified image comprises the texture within the region to be in-painted.

15. The apparatus of claim 14, further comprising:
an encoder configured to generate input features for the image, wherein the first input sequence of feature patches is based on the input features.

16. The apparatus of claim 14, further comprising:
a skip connection between the first attention network and the third attention network.

17. The apparatus of claim 14, further comprising:
a fourth attention network configured to transform a fourth input sequence of feature patches using a fourth attention network to obtain a fourth output sequence of feature patches, wherein the first input sequence of feature patches is based on the fourth output sequence of feature patches; and
a fifth attention network configured to transform a fifth input sequence of feature patches to obtain a fifth output sequence of feature patches, wherein the fifth input sequence of feature patches is based on the third output sequence of feature patches, and the modified image is generated based on the fifth output sequence of feature patches; and
a skip connection between the fourth attention network and the fifth attention network.

18. The apparatus of claim 17, further comprising:
a third convolution network configured to perform a third convolution operation on fourth combined output features to obtain first combined input features, wherein the fourth combined output features comprise an arrangement of the fourth output sequence of feature patches and the first combined input features comprise an arrangement of the first input sequence of feature patches; and
a fourth convolution network configured to perform a fourth convolution operation on third combined output features to obtain fifth combined input features, wherein the third combined output features comprise an arrangement of the third output sequence of feature patches and the fifth combined input features comprise an arrangement of the fifth input sequence of feature patches.

19. The apparatus of claim 14, further comprising:
a discriminator network configured to determine whether an output of the decoder is an original image or a generated image.

20. The apparatus of claim 14, further comprising:
a style component configured to generate statistical style information based on an output of the decoder.

* * * * *